US010701697B2

(12) United States Patent
Werner et al.

(10) Patent No.: US 10,701,697 B2
(45) Date of Patent: Jun. 30, 2020

(54) TECHNIQUE FOR SCRAMBLING REFERENCE SIGNALS

(71) Applicant: Telefonaktiebolaget LM Ericsson (publ), Stockholm (SE)

(72) Inventors: Karl Werner, Segeltorp (SE); Lars Lindbom, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 202 days.

(21) Appl. No.: 16/062,538

(22) PCT Filed: Apr. 27, 2018

(86) PCT No.: PCT/EP2018/060937
§ 371 (c)(1),
(2) Date: Jun. 14, 2018

(87) PCT Pub. No.: WO2019/206432
PCT Pub. Date: Oct. 31, 2019

(65) Prior Publication Data
US 2020/0092889 A1 Mar. 19, 2020

(51) Int. Cl.
*H04W 72/04* (2009.01)
*H04L 5/00* (2006.01)

(52) U.S. Cl.
CPC ....... *H04W 72/0466* (2013.01); *H04L 5/0007* (2013.01); *H04L 5/0048* (2013.01); *H04L 5/0073* (2013.01); *H04W 72/042* (2013.01)

(58) Field of Classification Search
CPC ............ H04W 72/042; H04W 72/0466; H04L 5/0007; H04L 5/0048; H04L 5/0073
See application file for complete search history.

(56) References Cited

U.S. PATENT DOCUMENTS

2011/0085503 A1 4/2011 Nam et al.
2013/0287064 A1* 10/2013 Seo ........................ H04J 13/18 375/144

(Continued)

OTHER PUBLICATIONS

Ericsson, "R1-1721383: Sequence initialization for DMRS and CSI-RS," 3GPP TSG-RAN WG1 #91, Nov. 27-Dec. 1, 2017, Reno, USA, 12 pages.

(Continued)

*Primary Examiner* — Michael Thier
*Assistant Examiner* — Brian P Cox
(74) *Attorney, Agent, or Firm* — Withrow & Terranova, PLLC

(57) ABSTRACT

A technique for controlling and using a reference signal for a radio link between a base station and a radio device is described. As to a method aspect of the technique, a control message indicative of a scrambling identifier selector for selecting a scrambling identifier associated with the radio link is transmitted to the radio device. The transmitted scrambling identifier selector depends on a time index and a link identifier associated with the radio link. Over the radio link, the reference signal is transmitted to or received from the radio device at a time according to the time index. The reference signal is based on a pseudo-random binary sequence, which is generated using a seed value depending on the time index, the scrambling identifier selector and the scrambling identifier selected according to the scrambling identifier selector.

26 Claims, 13 Drawing Sheets

(56) References Cited

U.S. PATENT DOCUMENTS

2014/0092829 A1* 4/2014 Han ...................... H04L 5/0035
370/329
2014/0293943 A1* 10/2014 Yoon ..................... H04L 5/0091
370/329

OTHER PUBLICATIONS

International Search Report and Written Opinion for International Patent Application No. PCT/EP2018/060937, dated Jan. 7, 2019, 17 pages.

Author Unknown, "Technical Specification Group Radio Access Network; Evolved Universal Terrestrial Radio Access (E-UTRA); Physical channels and modulation (Release 14)," Technical Specification 36.211, Version 14.4.0, 3GPP Organizational Partners, Sep. 2017, 197 pages.

Author Unknown, "Technical Specification Group Radio Access Network; Evolved Universal Terrestrial Radio Access (E-UTRA); Physical channels and modulation (Release 15)," Technical Specification 36.211, Version 15.1.0, 3GPP Organizational Partners, Mar. 2018, 221 pages.

Author Unknown, "Technical Specification Group Radio Access Network; NR; Physical channels and modulation (Release 15)," Technical Specification 38.211, Version 1.0.0, 3GPP Organizational Partners, Sep. 2017, 37 pages.

Author Unknown, "Technical Specification Group Radio Access Network; NR; Physical channels and modulation (Release 15)," Technical Specification 38.211, Version 1.3.0, 3GPP Organizational Partners, Dec. 2017, 73 pages.

Author Unknown, "Technical Specification Group Radio Access Network; NR; Physical channels and modulation (Release 15)," Technical Specification 38.211, Version 15.0.0, 3GPP Organizational Partners, Dec. 2017, 73 pages.

Author Unknown, "Technical Specification Group Radio Access Network; NR; Physical channels and modulation (Release 15)," Technical Specification 38.211, Version 15.1.0, 3GPP Organizational Partners, Mar. 2018, 90 pages.

* cited by examiner

100

200

900

1000

TECHNIQUE FOR SCRAMBLING REFERENCE SIGNALS

This application is a 35 U.S.C. § 371 national phase filing of International Application No. PCT/EP2018/060937, filed Apr. 27, 2018, the disclosure of which is incorporated herein by reference in its entirety.

TECHNICAL FIELD

The present disclosure relates to a technique for scrambling reference signals. More specifically, and without limitation, methods and devices are provided for controlling and using reference signals for a radio link between a base station and a radio device.

BACKGROUND

For radio communication, e.g., in wireless radio communication systems such as Long Term Evolution (LTE) and New Radio (NR) according to the Third Generation Partnership Project (3GPP), a reference signal (RS) is transmitted to determine a state of a radio channel between a base station and a radio device or to track impairments induced by a local oscillator of a transceiver of the radio device. The definition of the RS depends on its use case. Several types of RSs are defined in a wireless radio communication system, each serving one or more purposes. For example, a RS defined and used for coherent demodulation of a physical layer channel is referred to as demodulation reference signal (DM-RS), a RS defined and used for acquiring channel state information (CSI) in a downlink (DL) from the base station to the radio device is referred to as CSI-RS and a RS defined for tracking of time and frequency differences between transmitter and receiver is referred to as tracking RS (TRS).

Each transmitted RS is based on a sequence of values that define the modulation symbols respectively transmitted on radio resource elements (REs) configured or allocated for the RS. The sequence needs to be carefully selected to enable low cross-correlations between different RSs, i.e., RSs based on different sequences. For example, interference between RSs transmitted from different transmission and reception points (TRPs) should be mutually randomized. This means that a receiver should experience an interfering RS, i.e., a RS transmitted from another TRP not serving the receiver, as noise. This is typically achieved by assigning different sequences to different TRPs.

For the 3GPP NR waveform using orthogonal frequency-division multiplexing (OFDM) with a cyclic prefix (CP), it has been decided that the sequences defining the RSs shall be based on pseudo-random binary sequences (PRBSs) derived from Gold sequences. The desirable noise-like behavior is then achieved by assigning different PRBS seeds to different radio links.

However, the time dependency of the PRBS seed is such that the statistical behavior of the cross-correlations between RSs transmitted from a given pair of TRPs over time is not sufficiently randomized. Rather, the statistical behavior of the cross-correlations between RSs transmitted from a given pair of TRPs depends on the scrambling identifiers assigned to these TRPs. For example, only $2^{13}$ sequences with consistent cross-correlation properties exist for 3GPP NR, although the scrambling identifier comprises more than 13 bits. As a consequence, a wireless radio communication system, such as 3GPP NR with 1008 different physical cell identifiers (PCIs), has only on the order of 8 unique sequences per cell.

SUMMARY

Accordingly, there is a need for a technique that increases the number of radio link-specific reference signals with consistent statistics of cross-correlations between reference signals assigned to different radio links.

As to a first method aspect, a method of controlling a reference signal (RS) for a radio link between a base station and a radio device is provided. The method may comprise or initiate a step of transmitting, to the radio device, a control message indicative of a scrambling identifier selector for selecting a scrambling identifier associated with the radio link. The transmitted scrambling identifier selector may depend on a time index and/or a link identifier associated with the radio link. The method may comprise or initiate a step of transmitting to and/or receiving from the radio device over the radio link the RS at a time according to the time index. The RS may be based on a pseudo-random binary sequence (PRBS). The PRBS may be generated or generatable using a seed value depending on the time index, the scrambling identifier selector and the scrambling identifier selected according to the scrambling identifier selector.

At least in some embodiments, the scrambling identifier selector can introduce a further time-dependency in the generation of the RS. A set of RSs with consistent statistics of their pair-correlations over time can be increased, e.g., for increasing a size of a cell served by the base station and/or for increasing a density of embodiments of the radio device served by the base station or by a cell of the base station.

The scrambling identifier selector may be a control parameter. The scrambling identifier that is used for determining the seed value may be selected based on the scrambling identifier selector. The scrambling identifier selector may be a control parameter that is shared between the base station and the radio device, so that both the base station and the radio device select the same scrambling identifier for the determining of the seed value. For example, the base station may configure the radio device by transmitting the control message indicative of the scrambling identifier selector to the radio device. The scrambling identifier selector may comprise one or more bits. The selected scrambling identifier may be selected according to the scrambling identifier selector among two or more selectable scrambling identifiers. The scrambling identifier selector may comprise x bits for selecting one among $2^x$ (i.e., two to the x) selectable scrambling identifiers. For example, x=1.

The method of controlling a RS may be implemented as a method of controlling the generation of a RS.

Herein, a set of RSs may be consistent (i.e., may have consistent statistics of their correlations over time), if all pair-correlations (i.e., the cross-correlations of all pairs) of the RSs in the set over time fulfill a statistical criterion. For example, a variance of the pair-correlations over time may be less than a predefined threshold value for all RSs in the set and/or a mean value of the pair-correlations over time may be within a predefined range for all RSs in the set. Embodiments of the technique can reduce the variance and/or the range.

In same or further embodiments, by virtue of the combined dependency of the scrambling identifier selector on the time index and the link identifier, the seed values may generate PRBSs that are randomly correlated for different link identifiers and/or different selected scrambling identifiers. For example, the indirect time index-dependency brought about by the scrambling identifier selector in the seed value may generate PRBSs, wherein the pseudo-randomness of the PRBSs is specific for the link identifier.

Using the RSs derived from such PRBSs can reduce the interference between different radio links.

The method may be performed or initiated by the base station. The base station may be a New Radio (NR) base station (e.g., a gNode B or gNB) according to the Third Generation Partnership Project (3GPP). The radio device may be a 3GPP user equipment (UE).

Herein, the scrambling identifier selector may be denoted by the symbol $n_{SCID}$. The scrambling identifier may be denoted by the symbol $N_{ID}$. The link identifier may be denoted by the symbol M. The seed value may be denoted by the symbol $c_{init}$. The PRBS may be denoted by the symbol c. The RS (e.g., a sequence of modulation symbols transmitted or received at the time according to the time index) may be denoted by the symbol r.

The control message may be communicated using downlink control information (DCI) over the radio link.

The link identifier, the selected scrambling identifier and/or one or each of the scrambling identifiers for the selection (also: selectable scrambling identifiers) may be indicative of at least one of the base station, the radio link and the radio device.

The link identifier, the selected scrambling identifier and/or the selectable (e.g., a pair of) scrambling identifiers may be collectively referred to as identifiers. Any of the identifiers may be indicative of or specific for the base station by indicating or being associated with a transmission and reception point (TRP), e.g., serving the radio device, by indicating or being associated with a cell of the base station, e.g., serving the radio device, or by indicating or being associated with an antenna port of the base station. Alternatively or in addition, the link identifier and/or the scrambling identifier selected according to the scrambling identifier selector may be indicative of or specific for the radio device. For example, any of the identifiers may enable a multi-user (MU) multiple-input multiple-output (MIMO) radio communication of the base station. Alternatively or in addition, any of the identifiers may be indicative of the radio link, e.g., by indicating a beam or a spatial stream of the radio link. Alternatively or in addition, any of the identifiers may be indicative of the radio link by indicating the combination of the base station and the radio device.

One or each of the selectable scrambling identifiers may be identical to the link identifier, an identifier of the base station, an identifier of the radio device or a combination thereof.

The scrambling identifier may be indicative of the base station, the radio device or a combination of the base station and the radio device. For example, the scrambling identifier may be a function of or comprise a physical cell identifier (PCI) of the base station and/or a (e.g., cell) radio network temporary identifier (RNTI, e.g., C-RNTI).

Any of the identifiers may be indicative of the radio link or the combination of base station and radio device by comprising both the PCI of the base station and the RNTI (e.g., the C-RNTI) of the radio device. Alternatively or in addition, any of the identifiers may be indicative of the radio link or the combination of base station and radio device by mapping the PCI and the RNTI to the respective identifier.

The selectable scrambling identifiers may comprise two scrambling identifiers, which may also be referred to as pair of scrambling identifiers.

The scrambling identifier associated with the radio link may be selected among a pair of selectable scrambling identifiers. One or each of the pair of scrambling identifiers may be a function of the link identifier.

The method may further comprise or initiate a step of transmitting, to the radio device, a radio resource control (RRC) message indicative of the link identifier. One or each of the pair of scrambling identifiers may be configured at the radio device according to the function in conjunction with the transmitted link identifier.

The scrambling identifier associated with the radio link may be selected among a pair of selectable scrambling identifiers. One or each of the pair of scrambling identifiers may be independent of the link identifier.

The method may further comprising a step of transmitting, to the radio device, a RRC message indicative of one or each of the pair of scrambling identifiers. The base station may configure one or each of the pair of scrambling identifiers at the radio device. The pair of scrambling identifiers may be RRC-configured and used for computing the seed value in conjunction with the scrambling identifier selector, e.g., as specified in, or in extension of, the document 3GPP TS 38.211, version 15.0.0, e.g., clauses 7.4.1.1.1.

The scrambling identifiers selectable according to the scrambling identifier selector may be identical. For example, the pair of scrambling identifiers may be identical. That is, $N_{ID}^{(0)}$ and $N_{ID}^{(1)}$ may be equal.

Alternatively, only one of the pair of scrambling identifiers may be indicative of the radio link. If the base station determines the seed value using $M=N_{ID}^{(0)}$ as the selected scrambling identifier and finds the result $n_{SCID}=1$ for the scrambling identifier selector (or vice versa), the base station may use RRC signaling to swap $N_{ID}^{(0)}$ and The time index may be indicative of the time of transmission or reception of the RS in units of orthogonal frequency-division multiplexing (OFDM) symbols. The time index may correspond to one OFDM symbol used for the transmission or reception of the RS. The seed value may depend (e.g., explicitly) on the time index. A PRBS (and a corresponding RS) may be generated for each OFDM symbol.

The control message may be transmitted, and the corresponding RS may transmitted or received, in the same transmission time interval (TTI). The time index may be indicative of an OFDM symbol within the TTI. For example, the time index is not only a symbol index within the TTI. The time index may be uniquely indicative of the OFDM symbol within a radio frame.

The correspondence between the control message and the RS may be defined by the same time index being used for determining the scrambling identifier selector (transmitted in the control message) and for determining the seed value (generating the RS).

The TTI may be a slot or subframe in a radio frame structure used by the radio link.

The RS may be transmitted or received on a plurality of resource elements (REs) at the time according to the time index. Each of the REs may correspond to one or more bits of the PRBS according to a modulation scheme. The RS may comprise a plurality of REs of the OFDM symbol, e.g., on different subcarriers. The RS generated from one PRBS and/or one seed value may be transmitted only in one OFDM symbol (e.g., over multiple REs in the frequency domain). Each of the REs corresponds to two bits of the PRBS according to Quadrature Phase Shift Keying (QPSK).

One or more bits in the seed value may be indicative of the scrambling identifier selector. For example, the least significant bit (LSB) of the seed value may be indicative of the scrambling identifier selector.

The RS may be transmitted to the radio device for a downlink (DL) data transmission. The RS may enable a coherent demodulation of the DL data transmission at the radio device, e.g., for a physical downlink shared channel (PDSCH). The PRBS and/or the RS may be generated according to the document 3GPP TS 38.211, version 15.0.0, clause 7.4.1.1.1.

Alternatively or in addition, the RS may be received from the radio device for an uplink (UL) data reception. The RS may enable a coherent demodulation of the UL data transmission at the base station, e.g., for a physical uplink shared channel (PUSCH). The PRBS and/or the RS may be generated according to the document 3GPP TS 38.211, version 15.0.0, clause 6.4.1.1.1. For the UL data transmission, it may still be the base station that determines the scrambling identifier selector, the selected scrambling identifier and/or the link identifier.

The method may further comprise or initiate a step of transmitting to and/or receiving from the radio device data that is scrambled using at least one of the selected scrambling identifier and the generated PRBS.

The seed value may be a linear function of the time index. Alternatively or in addition, the dependency of the scrambling identifier selector on the time index may comprise a product of the time index and an identifier function applied to the link identifier. Optionally, the seed value may comprise a term according to $$t \cdot f_{ID}(M),$$

wherein t is the time index, M is the link identifier and $f_{ID}$ is the identifier function.

The identifier function may be a linear function. Optionally, the identifier function may be $$f_{ID}(x)=2x+1.$$

Alternatively or in addition, the identifier function may be any bijective function (i.e., a function that is one-to-one) and/or any function that always give odd values.

The seed value may comprise the k−1 least significant bits of the product of the time index and the identifier function applied to the selected scrambling identifier. The dependency on the scrambling identifier selector may comprise the k-th bit of the product of the time index and the identifier function applied to the link identifier. The value of k may be (e.g., on the order of) half of the bits of the seed value. For example, k=15.

By using the same identifier function in both the seed value and the scrambling identifier selector, the k bits used for differentiating the RS based on the selected scrambling identifier may be augmented to further differentiate the RS based on the link identifier, e.g., also if the selected scrambling identifier and the link identifier are identical. Alternatively or in addition, by using the same identifier function in both the seed value and the scrambling identifier selector as multiplicator for the time index, the statistics of the cross-correlations of RSs generated over time for different selected scrambling identifiers and/or different link identifiers may be consistent.

The transmitting of the RS may comprise or initiate a step of generating the PRBS prior to the transmission of the RS. The transmitted RS may be modulated according to the PRBS.

Alternatively or in addition, the receiving of the RS may comprise or initiate a step of generating the PRBS after the reception of the RS. The received RS may be compared to the generated PRBS. The receiving of the RS may further comprises or initiates a step of estimating a time shift of a local oscillator based on the comparison and/or a step of estimating a channel of the radio link based on the comparison. The channel may be estimated by using the generated PRBS in a matched filter step in a channel estimator.

The base station may maintain radio links with a plurality of radio devices. The base station may perform the first method aspect with respect to each of the plurality of radio devices. The different instances of the method performed with respect to different radio devices or different radio links may use different RSs generated based on respectively different link identifiers.

A frequency resource (e.g., a resource block in the frequency domain), a time resource (e.g., one or more Ills or resource blocks in the time domain) and a spatial resource (e.g., one or more spatial streams, a directional transmission or a direction reception) of the data transmission may depend on a measurement of the RS. Alternatively or in addition, one or more transmission parameters of the data transmission may depend on the measurement of the RS. The transmission parameters may comprise a transmission power and/or precoding weights (e.g., a precoding vector or precoding matrix, e.g., for a beamforming transmission or a MIMO channel).

The radio link may use, depending on the channel state measured based on the RS, at least one of a modulation coding scheme (MCS), a precoding matrix, a transmission rank for a multiple-input multiple-output (MIMO) channel and a transmit power.

As to a second method aspect, a method of using a reference signal (RS) for a radio link between a base station and a radio device is provided. The method may comprise or initiate a step of receiving, from the base station, a control message indicative of a scrambling identifier selector for selecting a scrambling identifier associated with the radio link. The received scrambling identifier selector may depend on a time index and/or a link identifier associated with the radio link. The method may comprise or initiate a step of transmitting to and/or receiving from the base station over the radio link the RS at a time according to the time index. The RS may be based on a pseudo-random binary sequence (PRBS). The PRBS may be generated or generatable using a seed value depending on the time index, the scrambling identifier selector and the scrambling identifier selected according to the scrambling identifier selector.

The method may be performed or initiated by the radio device. The radio device may be a Third Generation Partnership Project (3GPP) user equipment (UE).

The second method aspect may further comprise any feature, or may comprise or initiate any step, disclosed in the context of the first method aspect or a feature or step corresponding thereto. Moreover, the first method aspect may be performed at or by the base station. Alternatively or in combination, the second method aspect may be performed at or by the radio device. The base station and the radio device may be spaced apart. The base station and the radio device may be in data and/or signal communication exclusively by means of the radio link.

At least one of the base station and the radio device may be configured to exchange data with or forward the data from or to the Internet, particularly a host computer. At least one of the base station and the radio device may function as a gateway to the Internet and/or the host computer. The data from the host computer may comprise media streams (e.g., video or music), network feeds (e.g., sequences of images and texts), search engine results (e.g., a list of universal resource locators), speech recognition services (an audio stream of a synthesized voice from the host computer responsive to a recorded audio stream sent to the host computer), location-specific information (e.g., objects for rendering an augmented reality) and/or program code (e.g., for mobile applications or "apps").

At least one or each of the base station and the radio device may comprise an antenna array. The base station and/or the radio device may use its antenna array (e.g., for transmitting and/or receiving the RS and/or data) based on a measurement of the RS. Using the antenna array may comprise a directional transmission (e.g., preceding the antenna array) and/or a directional reception (e.g., coherently combining the antenna array).

In any aspect, the base station and the radio device may form, or may be part of, a wireless radio communication system (also: communication system or radio network), e.g., according to the 3GPP or according to the standard family Institute of Electrical and Electronics Engineers (IEEE) 802.11 (Wi-Fi). The first method aspect may be performed by one or more embodiments of the base station in the radio network. The second method aspect may be performed by one or more embodiments of the radio device in the radio network.

Herein, the radio device may be a mobile or wireless radio device, e.g., a 3GPP user equipment (UE) or a Wi-Fi station (STA). The radio device may be mobile or portable station, a device for machine-type communication (MTC), a device for narrowband Internet of Things (NB-loT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with the base station.

Herein, the base station may encompass any station that is configured to provide radio access to any of the first and second radio devices. The base station may be embodied by a TRP, a radio access node or an access point (AP). A radio access network (RAN) may comprise one or more embodiments of the base station. Examples for the base stations may include a 3G base station or Node B, 4G base station or eNodeB, a 5G base station or gNodeB, and a Wi-Fi AP.

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY) of a protocol stack for the radio link, e.g., the PHY of 3GPP NR. Alternatively or in addition, any aspect of the technique may be controlled or initiated by a Medium Access Control (MAC) layer, a Radio Link Control (RLC) layer and/or a Radio Resource Control (RRC) layer of the protocol stack.

As to another aspect, a computer program product is provided. The computer program product comprises program code portions for performing any one of the steps of any one of the method aspects disclosed herein when the computer program product is executed by one or more computing devices. The computer program product may be stored on a computer-readable recording medium. The computer program product may also be provided for download via the radio network, the RAN, the Internet and/or the host computer. Alternatively or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for controlling a reference signal (RS) for a radio link between a base station and a radio device is provided. The device may be configured to perform the first method aspect. The device may comprise a transmitting unit configured to transmit, to the radio device, a control message indicative of a scrambling identifier selector for selecting a scrambling identifier associated with the radio link. The transmitted scrambling identifier selector depends on a time index and/or a link identifier associated with the radio link. The device may comprise a transmitting unit configured to transmit to and/or a receiving unit configured to receive from the radio device over the radio link the RS at a time according to the time index. The RS may be based on a pseudo-random binary sequence (PRBS). The PRBS may be generated or generatable using a seed value depending on the time index, the scrambling identifier selector and the scrambling identifier selected according to the scrambling identifier selector.

The device for controlling a RS may be implemented as a device for controlling the generation of a RS.

As to a second device aspect, a device for using a reference signal (RS) for a radio link between a base station and a radio device is provided. The device may be configured to perform the second method aspect. The device may comprise a receiving unit configured to receive, from the base station, a control message indicative of a scrambling identifier selector for selecting a scrambling identifier associated with the radio link. The received scrambling identifier selector may depend on a time index and/or a link identifier associated with the radio link. The device may comprise a transmitting unit configured to transmit to and/or a receiving unit configured to receive from the base station over the radio link the RS at a time according to the time index. The RS may be based on a pseudo-random binary sequence (PRBS). The PRBS may be generated or generatable using a seed value depending on the time index, the scrambling identifier selector and the scrambling identifier selected according to the scrambling identifier selector.

As to a further first device aspect, a device for controlling a reference signal (RS) for a radio link between a base station and a radio device is provided. The device may comprise at least one processor and a memory. Said memory may comprise instructions executable by said at least one processor, whereby the first radio device may be operative to transmit, to the radio device, a control message indicative of a scrambling identifier selector for selecting a scrambling identifier associated with the radio link. The transmitted scrambling identifier selector may depend on a time index and/or a link identifier associated with the radio link. Execution of the instructions may further cause the device to be operative to transmit to and/or receive from the radio device, over the radio link, the RS at a time according to the time index. The RS may be based on a pseudo-random binary sequence (PRBS). The PRBS may be generated or generatable using a seed value depending on the time index, the scrambling identifier selector and the scrambling identifier selected according to the scrambling identifier selector.

The device for controlling a RS may be implemented as a device for controlling the generation of a RS.

As to a further second device aspect, a device for using a reference signal (RS) for a radio link between a base station and a radio device is provided. The device may comprise at least one processor and a memory. Said memory may comprise instructions executable by said at least one processor, whereby the second radio device may be operative to receive, from the base station, a control message indicative of a scrambling identifier selector for selecting a scrambling identifier associated with the radio link. The received scrambling identifier selector may depend on a time index and/or a link identifier associated with the radio link. Execution of the instructions may further cause the device to be operative to transmit to and/or receive from the base station, over the radio link, the RS at a time according to the time index. The RS may be based on a pseudo-random binary sequence (PRBS). The PRBS may be generated or generatable using a seed value depending on the time index, the scrambling identifier selector and the scrambling identifier selected according to the scrambling identifier selector.

As to a still further aspect a communication system including a host computer is provided. The host computer may comprise a processing circuitry configured to provide user data, e.g., depending on a location of the UE. The host computer may further comprise a communication interface configured to forward user data to a cellular network for transmission to a user equipment (UE), wherein the UE comprises a radio interface and processing circuitry. A processing circuitry of the cellular network may be configured to execute any one of the steps of the first method aspect. Alternatively or in addition, the processing circuitry of the UE may be configured to execute any one of the steps of the second method aspect.

The communication system may further include the UE. Alternatively or in addition, the cellular network may further include one or more base stations and/or gateways configured to communicate with the UE and/or to provide a data link between the UE and the host computer using the first method aspect and/or the second method aspect.

The processing circuitry of the host computer may be configured to execute a host application, thereby providing the user data and/or any host computer functionality described herein. Alternatively or in addition, the processing circuitry of the UE may be configured to execute a client application associated with the host application.

The radio device (e.g., the UE), the base station (e.g., the TRP), the communication system or any node or station for embodying the technique may further include any feature disclosed in the context of the method aspects, and vice versa. Particularly, any one of the units and modules, or a dedicated unit or module, may be configured to perform or initiate one or more of the steps of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including 3GPP LTE (e.g., LTE-Advanced or a related radio access technique such as MulteFire) or in a Wireless Local Area Network (WLAN) according to the standard family IEEE 802.11.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
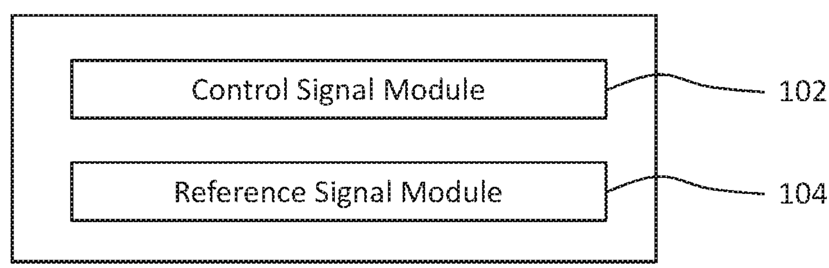
FIG. 1 shows a schematic block diagram of a device for controlling a reference signal for a radio link between a base station and a radio device in accordance with an embodiment.

FIG. 1 schematically illustrates a block diagram of a device for controlling a reference signal (RS) for a radio link between a base station and a radio device. The device controlling the RS is generically referred to by reference sign 100.

The device 100 comprises a control signal module 102 that transmits or initiates transmitting a control message to the radio device. The control message is indicative of a scrambling identifier selector for selecting a scrambling identifier associated with the radio link. The transmitted scrambling identifier selector depends on a time index and a link identifier associated with the radio link. The device 100 further comprises a reference signal module 104 that transmits or initiates transmitting the RS to the radio device or that receives or initiates receiving the RS from the radio device. The RS is transmitted or received over the radio link at a time according to the time index. The RS is based on a pseudo-random binary sequence (PRBS). The PRBS is generated using a seed value depending on the time index, the scrambling identifier selector and the scrambling identifier selected according to the scrambling identifier selector.

Any of the modules of the receiver 100 may be implemented by units configured to provide the corresponding functionality.

Figure 2:
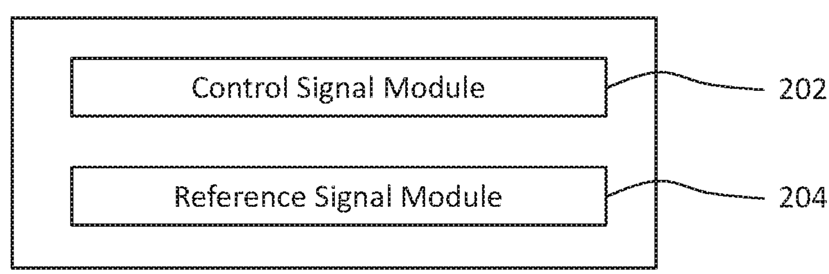
FIG. 2 shows a schematic block diagram of a device for using a reference signal for a radio link between a base station and a radio device in accordance with an embodiment.

FIG. 2 schematically illustrates a block diagram of a device for using a RS for a radio link between a base station and a radio device. The device using the RS is generically referred to by reference sign 200.

The receiver 200 comprises a control signal module 202 that receive a control message from the base station. The control message may be indicative of a scrambling identifier selector for selecting a scrambling identifier associated with the radio link. The received scrambling identifier selector depends on a time index and a link identifier associated with the radio link. The device 200 further comprises a reference signal module 204 that transmits or initiates transmitting the RS to the base station or that receives or initiates receiving the RS from the base station. The RS is transmitted or received over the radio link at a time according to the time index. The RS is based on a PRBS. The PRBS is generated using a seed value depending on the time index, the scrambling identifier selector and the scrambling identifier selected according to the scrambling identifier selector.

Any of the modules of the receiving device 200 may be implemented by units configured to provide the corresponding functionality.

Figure 3:
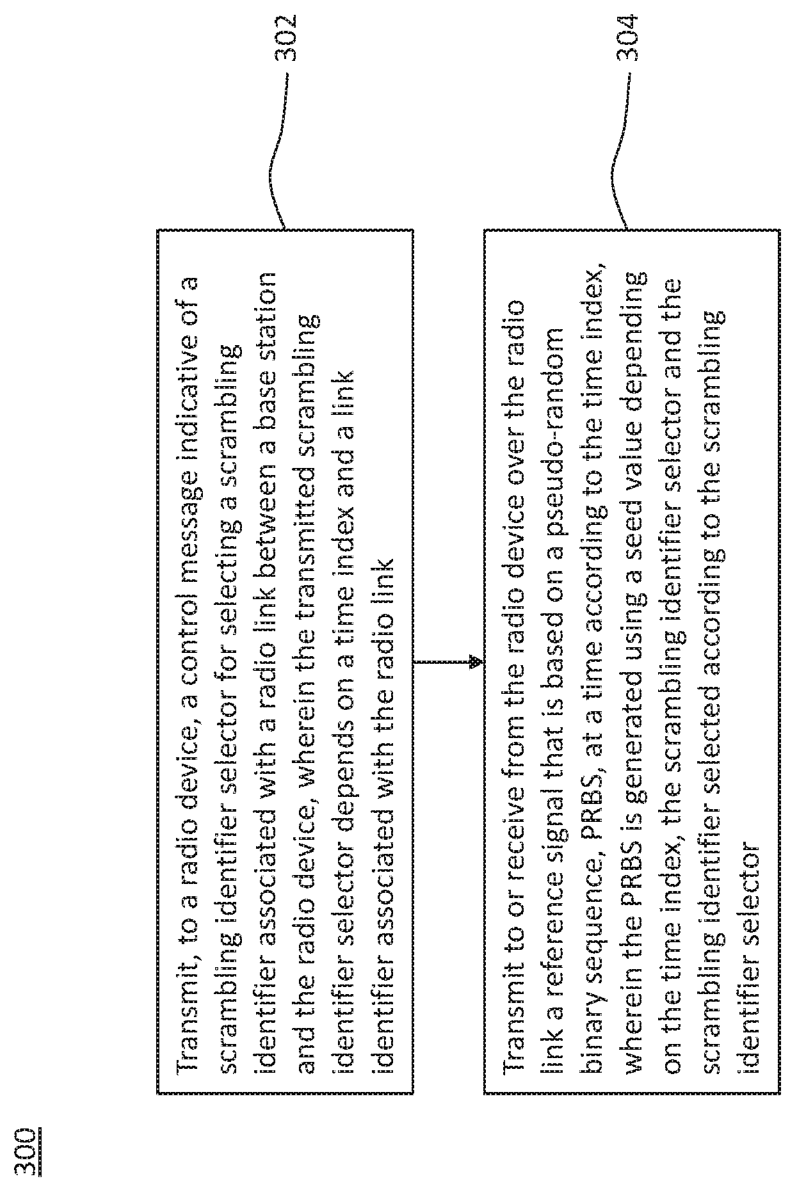
FIG. 3 shows a flowchart for a method of controlling a reference signal for a radio link between a base station and a radio device, which method may be implementable by the device of FIG. 1.

FIG. 3 shows a flowchart for a method 300 of controlling a RS for a radio link between a base station and a radio device. A control message indicative of a scrambling identifier selector, $n_{SCID}$, for selecting a scrambling identifier, $N_{ID}^{(n\_SCID)}$, associated with the radio link is transmitted to the radio device in a step 302 of the method 300. The transmitted scrambling identifier selector $n_{SCID}$ depends on a time index, t, and a link identifier, M, associated with the radio link. Over the radio link, the RS transmitted to or received from the radio device at a time according to the time index in a step 304. The RS is based on a PRBS, which is generated using a seed value depending on the time index t, the scrambling identifier selector $n_{SCID}$ and the scrambling identifier $N_{ID}^{(n\_SCID)}$ selected according to the scrambling identifier selector $n_{SCID}$.

The scrambling identifier $N_{ID}^{(n\_SCID)}$ associated with the radio link is selected among selectable scrambling identifiers, i.e., a pair of selectable scrambling identifiers, $N_{ID}^{(0)}$ and $N_{ID}^{(1)}$, or more selectable scrambling identifiers. Preferably, one or each of the pair of selectable scrambling identifiers $N_{ID}^{(0)}$ and $N_{ID}^{(1)}$ is identical to or a function of the link identifier M.

The method 300 may be performed by the transmitter 100. For example, the modules 102 and 104 may perform the steps 302 and 304, respectively.

Figure 4:
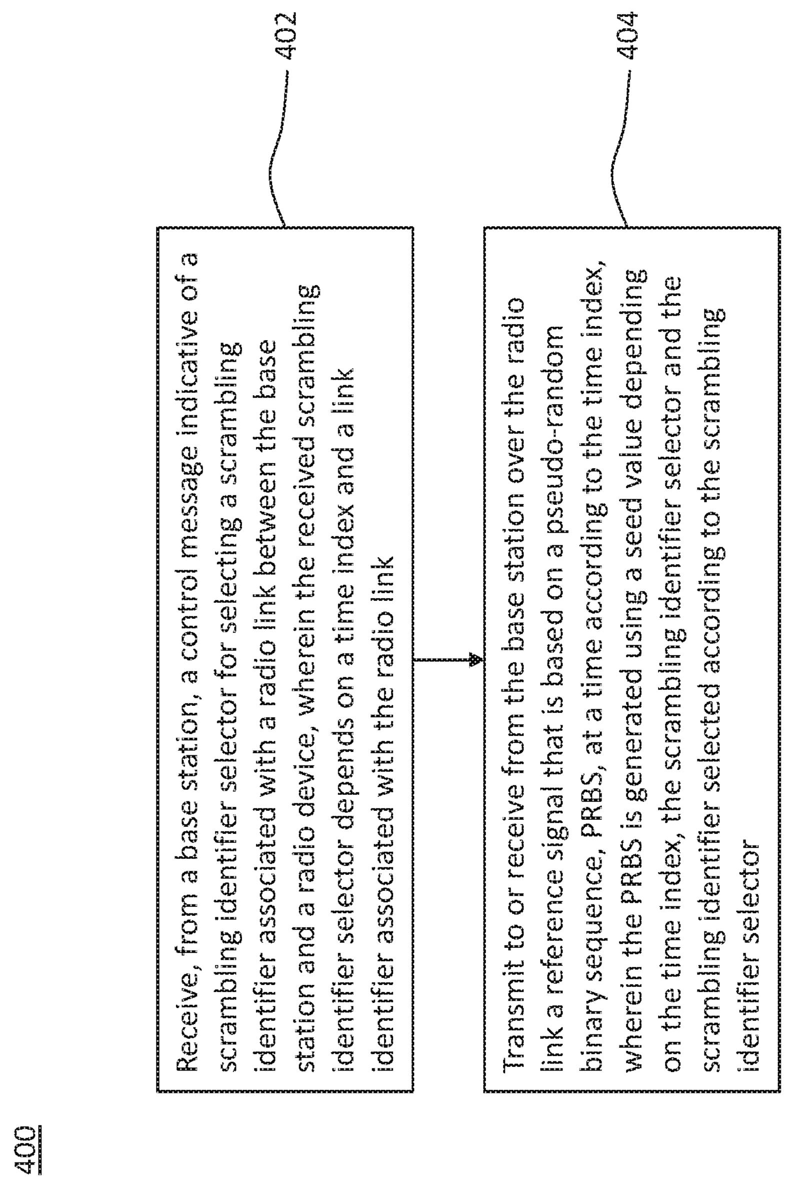
FIG. 4 shows a flowchart for a method of using a reference signal for a radio link between a base station and a radio device, which method may be implementable by the device of FIG. 2.

FIG. 4 shows a flowchart for a method 400 of using a RS for a radio link between a base station and a radio device. A control message indicative of a scrambling identifier selector, $n_{SCID}$, for selecting a scrambling identifier, $N_{ID}^{(n\_SCID)}$, associated with the radio link is received from the base station in a step 402 of the method 400. The received scrambling identifier selector $n_{SCID}$ depends on a time index, t, and a link identifier, M, associated with the radio link. Over the radio link, the RS is transmitted to or received from the base station at a time according to the time index in a step 404. The RS is based on a PRBS, which is generated using a seed value depending on the time index t, the scrambling identifier selector $n_{SCID}$ and the scrambling identifier $N_{ID}^{(n\_SCID)}$ selected according to the scrambling identifier selector $n_{SCID}$.

The method 400 may be performed by the device 200. For example, the modules 202 and 204 may perform the steps 402 and 404, respectively.

The technique may toggle the scrambling identifier selector $n_{SCID}$ by making it a function of the time index and the link identifier (e.g., the selected scrambling identifier $N_{ID}^{(n_{SCID})}$). If, e.g., the toggling introduces an implicit time-dependency in the seed value (and thus in the PRBS and the RS) complementary to the explicit time-dependency of the seed value, the number of available RS with consistent correlation properties can double. The technique is implementable at the base station (e.g., on a gNB side). For example, the technique may be implemented without additional bit fields in the control message (e.g., in downlink control information) and/or without changing functions for generating the PRBS at the radio device.

Herein, the device 100 may be embodied by the base station, another node of a radio access network (RAN), or a node connected to the RAN. The device 200 may be embodied by the radio device, e.g., any mobile or portable station or radio device wirelessly connectable to the RAN. Any embodiment of the radio device may be a user equipment (UE), a device for machine-type communication (MTC) and/or a device for (e.g., narrowband) Internet of Things (loT).

In any embodiment of the devices 100 and 200, e.g., compatible with 3GPP NR, a waveform for the radio link may use orthogonal frequency-division multiplexing (OFDM) with a cyclic prefix (CP) on the physical layer. Each RS may be transmitted in an OFDM symbol.

The PRBS may be a sequence of binary values defining the RS. The PRBS may be derived from Gold sequences. The PRBS, and thus the RS, is a function of time. That is, RSs transmitted for the same radio link in different OFDM symbols may be received as noise by another radio device that is not involved in the radio link.

For the noise-like reception of the RSs at the other radio device (e.g., in addition to different RSs transmitted for the same radio link being pseudo-random), it is desirable that the cross-correlations of RSs transmitted for different radio links are statistically indistinguishable. This is achievable by assigning different seed values for the PRBS to different radio links based on both the radio link-specific scrambling identifier associated with the radio link and, through the scrambling identifier selector, the radio link-specific link identifier associated with the radio link. By also using the scrambling identifier selector for distinguishing RSs associated with different radio links, the number of radio links using PBRS seed values with a radio-link specific time-dependency can be increased.

While the selected scrambling identifier (or all selectable scrambling identifiers) and the link identifier may be different for different radio links, any given radio link may be assigned a selected scrambling identifier (or selectable scrambling identifiers) identical to the link identifier.

Herein, radio links may be different by involving different transmitters of RSs and/or different intended receivers of the respective RSs. For a downlink (DL) transmission, the base station 100 may be the transmitter and the radio device 200 may be receiver, and vice versa for an uplink (UL) transmission.

The RS may support or enable a demodulation (DM) at the receiver. The RS may be a DM-RS. To allow the intended receiver of the DM-RS to determine the PRBS for generating the DM-RS, while still allowing the DM-RS to appear noise-like to other receivers, the seed value for the PRBS is also dependent on the link identifier, M, e.g., being equal to the selected scrambling identifier, $N_{ID}^{(n_{SCID})}$, or one or each of the selectable scrambling identifiers, $N_{ID}^{(i)}$, i=0, 1, . . . .

For brevity, the selected or any selectable scrambling identifier is referred to as a scrambling identifier, $N_{ID}$.

Any scrambling identifier and link identifier may identify (i.e., enable differentiating) different radio devices 200 and/or different base stations 100. In the case of DM-RS, the scrambling identifier $N_{ID}$ has 16 bits and is radio device-specifically configured, e.g., using radio resource control (RRC) signaling, or defined by a default value that corresponds to the physical cell identifier (PCI), $N_{ID}^{cell}$. When it is RRC-configured, a pair of two selectable scrambling identifiers is provided to the radio device 200, namely $N_{ID}^{(0)}$ $N_{ID}^{(1)}$. Which of the selectable scrambling identifiers is to be used is dynamically indicated by the scrambling identifier (SCID) selector, e.g., a 1-bit parameter $n_{scid} \in \{0, 1\}$.

Any scrambling identifier $N_{ID}$ and link identifier M may correspond to or may be a function of the PCI and/or a Cell Radio Network Temporary Identity (C-RNTI). There may be 3·168 or 2·3·168 values for the PCI. The PCI may be in the range of 0 to 503 or an extended PCI space (i.e., extended range of PCI values). For example, $N_{ID}^{cell} \in \{0, 1, \ldots, 1007\}$, e.g., according to subclause 7.4.2.1 in the document 3GPP TS 38.211, version 15.0.0.

Different radio link-specific scrambling identifiers and different radio link-specific link identifiers may be associated with the same base station 100 by distinguishing different embodiments of the radio device 100, e.g., for an embodiment of the base station 100 supporting multi-user (MU) multiple-input multiple-output (MIMO), e.g., according to the document 3GPP TS 36.211, version 15.1.0, clause 6.10.3.

In any embodiment, the scrambling identifier selector may be transmitted in the step 302 in in downlink control information (DCI). The scrambling identifier selector may be indicated by a scrambling identity field in the DCI, e.g., according to the document 3GPP TS 36.211, version 15.1.0, Table 6.10.3.1-1.

Figure 5A:
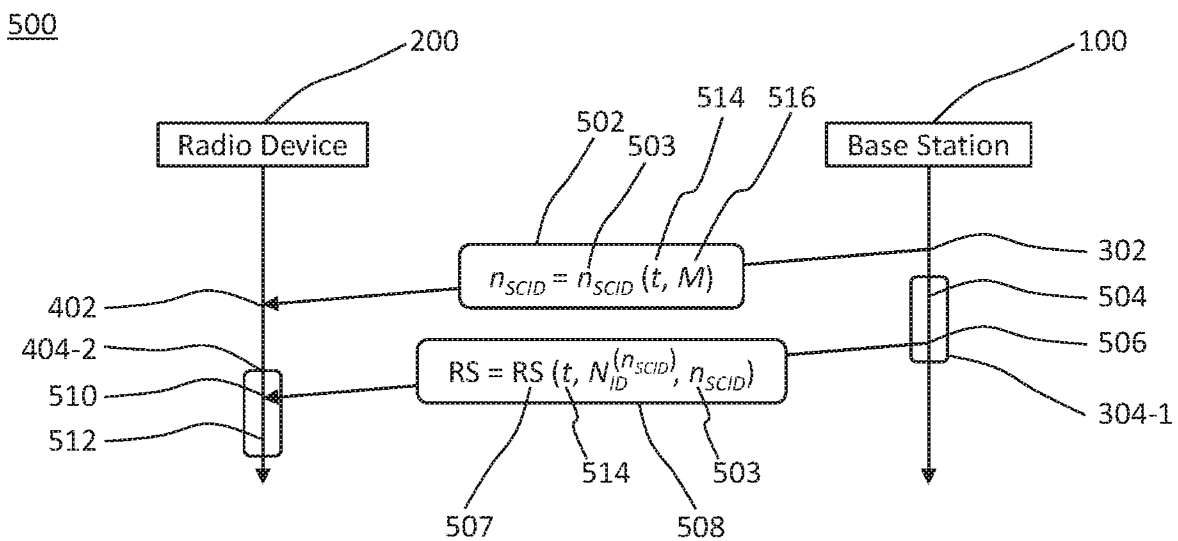
FIG. 5A schematically illustrates a first example of a signaling diagram resulting from embodiments of the devices of FIGS. 1 and 2 communicating over a radio link.

FIG. 5A schematically illustrates a first example of a signaling diagram 500 resulting from embodiments of the devices 100 and 200 communicating over the radio link. The control message 502 transmitted according to the step 302 and received according to the step 402 is indicative of the scrambling identifier selector 503, e.g., a 1-bit value.

In the first example, the base station 100 is the RS transmitter in the step 304, which case is referred to by reference sign 304-1. In a substep 504 of the step 304-1, the seed value is determined as a function of the time index, the selected scrambling identifier and the scrambling identifier selector, the determined seed value is loaded in a register and the RS 508 is generated. Thus, the RS 508 is a function 507 of the seed value being a function of the time index 514, the selected scrambling identifier and the scrambling identifier selector 503. The generated RS 508 is transmitted in a substep 506 of the step 304-1.

Furthermore, the scrambling identifier selector 503 is a function of the time index 514 and the link identifier 516.

The radio device 200 receives the scrambling identifier selector 503 in the step 402. In the first example, the radio device 200 is the RS receiver in the step 404, which case is referred to by reference sign 404-2. In a substep 510 of the step 404-2, the RS 508 is received. In a substep 512 of the step 404-2, the seed value is determined as a function of the time index 514, the selected scrambling identifier and the received scrambling identifier selector 503, the determined seed value is loaded in a register and the RS is independently generated for comparison with the received RS 508. Alternatively, the PRBS is generated in the step 512 and compared with the received PRBS, i.e., the PRBS demodulated from the received RS 508.

Figure 5B:
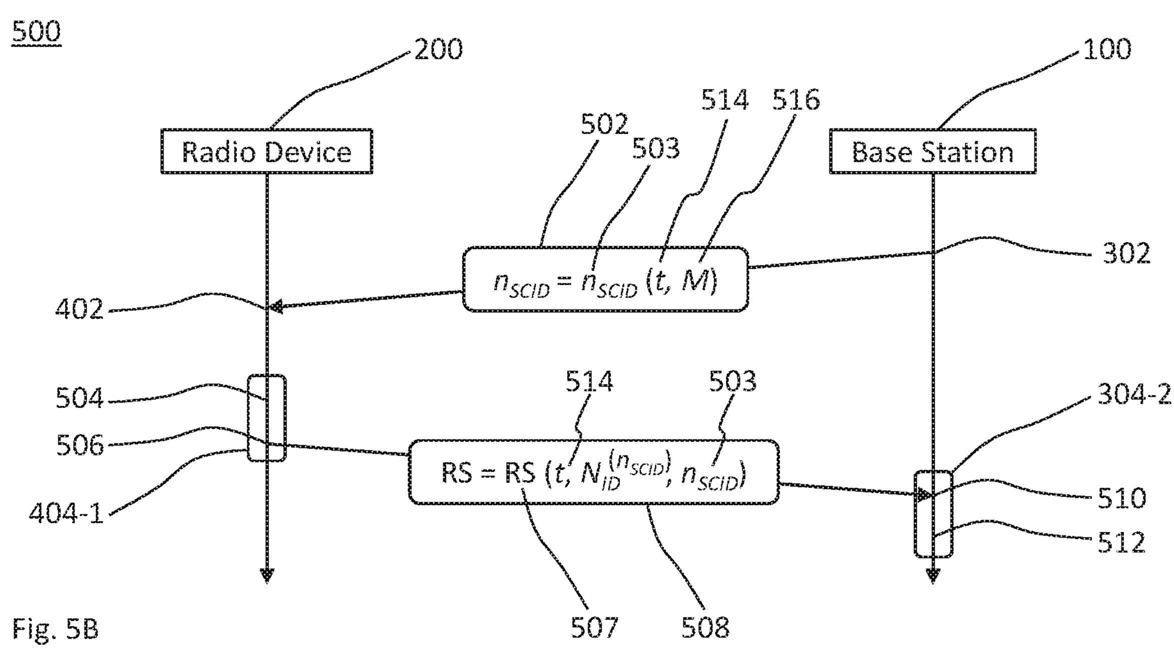
FIG. 5B schematically illustrates a second example of a signaling diagram resulting from embodiments of the devices of FIGS. 1 and 2 communicating over a radio link.

FIG. 5B schematically illustrates a second example of a signaling diagram 500 resulting from embodiments of the devices 100 and 200 communicating over the radio link. The control message 502 transmitted according to the step 302 and received according to the step 402 is indicative of the scrambling identifier selector 503, e.g., a 1-bit value.

In the second example, the radio device 200 is the RS transmitter in the step 404, which case is referred to by reference sign 404-1. In a substep 504 of the step 404-1, the seed value is determined as a function of the time index 514, the selected scrambling identifier and the received scrambling identifier selector 503. The determined seed value is loaded in a register and the RS 508 is generated. Thus, the RS 508 is a function 507 of the seed value being a function of the time index 514, the selected scrambling identifier and the scrambling identifier selector 503. The generated RS 508 is transmitted in a substep 506 of the step 404-1.

Furthermore, the received scrambling identifier selector 503 is a function of the time index 514 and the link identifier 516. Particularly, the radio device 200 may use the received scrambling identifier selector 503 only for generating the RS 508 to be transmitted at the time defined by the time index 514.

The base station 100 receives the scrambling identifier selector 503 in the step 302. In the second example, the base station 100 is the RS receiver in the step 304, which case is referred to by reference sign 304-2. In a substep 510 of the step 304-2, the RS 508 is received. In a substep 512 of the step 304-2, the seed value is determined as a function of the time index 514, the selected scrambling identifier and the received scrambling identifier selector 503. The determined seed value is loaded in a register and the RS is independently generated for comparison with the received RS 508. Alternatively, the PRBS is generated in the step 512 and compared with the received PRBS, i.e., the PRBS demodulated from the received RS 508.

Figure 6:
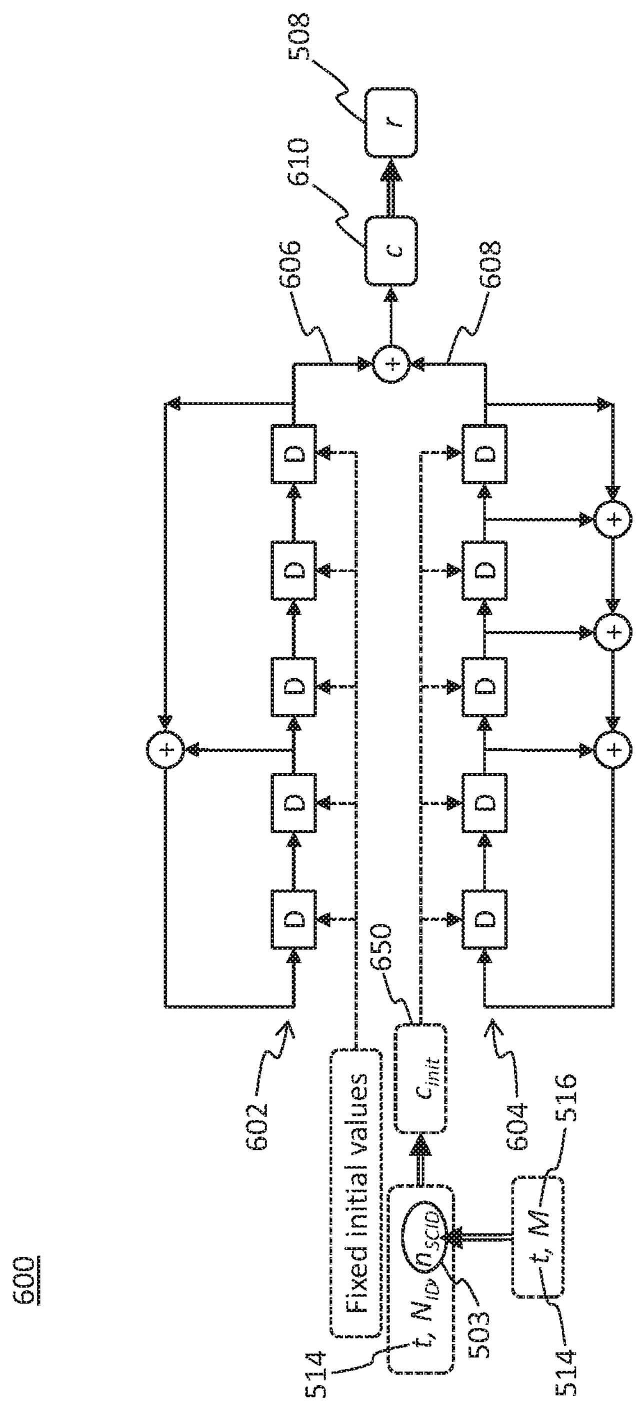
FIG. 6 shows a schematic block diagram for generating a reference signal in any embodiment of the device of FIG. 1 or 2.

FIG. 6 shows a schematic block diagram 600 for generating the PRBS 610, e.g., in any of the substeps 504 and 512. Optionally, e.g., in the substep 504 of the transmitting steps 304-1 and 404-1, the RS 508 is derived from the generated PRBS 610. Features described with reference to the block diagram 600 may be implementable in any embodiment of the devices 100 and/or 200.

The block diagram 600 comprises two linear feedback shift registers (LFSRs) 602 and 604. The initial state of the first LFSR 602 is fixed. The initial state of the second LFSR 604 is configurable and defined by the seed value 650, which is denoted by the symbol $c_{init}$. In the case of a DM-RS, $c_{init}$ is a function of the selected scrambling identifier, $N_{ID}$, the scrambling identifier selector 503, $n_{scid}$, and the time index 514.

The time index 514 may comprise a slot or TTI index, $n_s$, and an OFDM symbol index, l. The slot or TTI index may be indicative of a slot or TTI within a radio frame, e.g., $n_s=0, 1 \ldots, N_{slot}^{FRAME}-1$. The OFDM symbol index may be indicative of an OFDM symbol within the slot or TTI, e.g., $l\in\{0, 1, \ldots 13\}$, at which the RS 508 is transmitted according to the step 304-1 or 404-1. Alternatively or in addition, the time index 514 may be an a single value uniquely combining the slot or TTI index and the OFDM symbol index, e.g., according to $$t=14\cdot n_s+1.$$

In any embodiment, the range of the time index 514, t, may depend on the numerology of the physical layer used for the radio link or in the cell of the base station 100. For example, $t\in\{1, 2, \ldots, 14\cdot 10\cdot 2^{\mu}\}$ with $2^{\mu}\cdot 15$ kHz being the subcarrier spacing. The parameter $\mu$ may be an integer, e.g. $\mu\in\{0, 1, \ldots, 4\}$.

The PRBS 610, denoted by the symbol c(i), is a Gold sequence constructed from modulo-2 additions (i.e., exclusive or-operations) of two m-sequences 606 and 608 output by the registers 602 and 604, respectively. The Gold sequence 610 comprises q=bits, and each of the registers 602 and 604 comprises q bits. By way of example, q=31, e.g., by included 26 further bits at the left end of each of the registers 602 and 604.

The RS 508, e.g., the DM-RS used in NR transmissions with CP-OFDM waveforms, may be constructed according to $$r(m)=1/\sqrt{2}(1-2\cdot c(2m))+j1/\sqrt{2}(1-2\cdot c((2m+1),m=0,1, \ldots,$$

Figure 7:
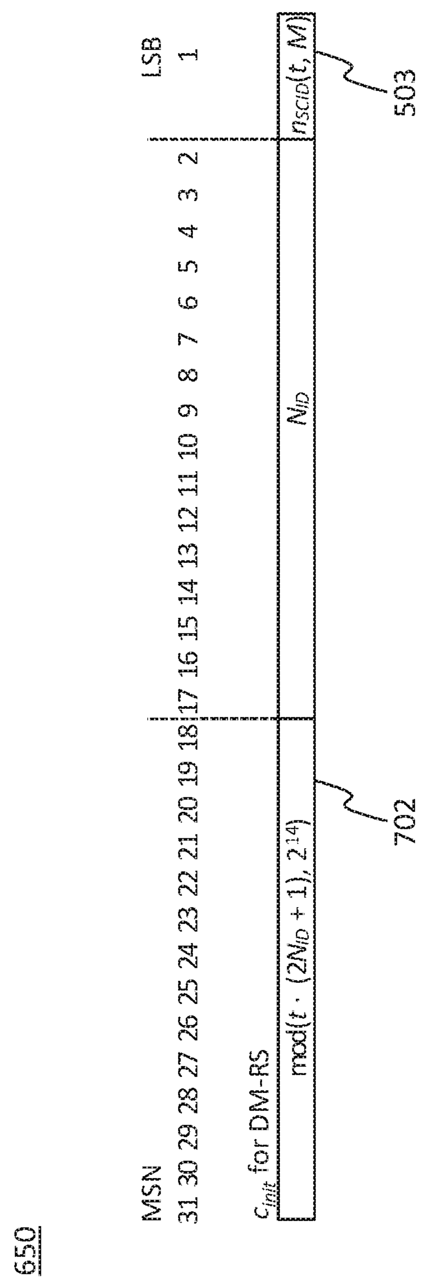
FIG. 7 shows an implementation of a data structure for a seed value usable in any embodiment of the device of FIG. 1 or 2.

FIG. 7 schematically illustrates an exemplary data structure of the seed value 650 for generating the PRBS 610. The definition or dependency of the PRBS seed value 650 comprises the scrambling identifier selector 503. Thus, the dependency of the scrambling identifier selector 503 on the time index 514 and the link identifier 516 are complementary to the dependency 702 on the time index 514 and the selected scrambling identifier. As a result, for any pair of radio links (e.g., each being associated with a unique scrambling identifier $N_{ID}$ and link identifier M), the statistical cross-correlation properties of the resulting PRBSs 610 (or the resulting RSs 508) generated by means of the corresponding pair of seed values 650, $\{c_{init-1}, c_{init-2}\}$, are the same over time. This means that a receiver configured with DM-RS generated (also: scrambled) using the seed value $c_{init-1}$ receives (after its matched filtering step) the interference from an interfering DM-RS scrambled using the seed value $c_{init-2}$ as noise with similar behavior (e.g., time-independent statistical properties) over time, independent of the actual seed value $c_{init-2}$. This statistical requirement or property does not necessarily imply or require that the cross-correlation properties of the PRBSs generated using $c_{init-1}$ and $c_{init-2}$ are independent of the actual seed values $c_{init-1}$ and $c_{init-2}$ in any given time instance. Rather, the cross-correlation as measured over time has equal or similar statistical properties. Herein, a set of PRBSs or a set of RSs generated or generatable by such seed values 650 is referred to as having consistent cross-correlation statistics, consistent correlation properties or, briefly, consistent correlation.

By way of example, as illustrated in FIG. 7, the seed value 650 (e.g., for initializing the DM-RS sequence) may be expressed or defined according to $$c_{init}(t,N_{ID},n_{SCID})=(t\cdot(2/N_{ID}+1)\cdot 2^{17}+2N_{ID}+n_{SCID}) \bmod 2^{31},$$

wherein $N_{ID}=N_{ID}^{(n_{SCID})}$ is the selected scrambling identifier, e.g., if the selectable scrambling identifiers and/or the scrambling identifier selector 503 are RRC-configured. Otherwise, the selected scrambling identifier may be a PCI of the base station 100, e.g., $N_{ID}=N_{ID}^{cell}$ and $n_{SCID}=0$.

As a reference example, using the data structure of the seed value 650, $c_{init}$, with a conventional $n_{SCID}$, i.e., without the radio link-specific time-dependency brought about by the scrambling identifier selector 503, the conventional time-dependency of the conventional seed value for the initialization is such that the statistical behavior of the cross-correlations depends on the actual selected scrambling identifiers $N_{ID-1}$ and $N_{ID-2}$ assigned to the pair of interfering radio links. In fact, only a set of $2^{13}$ PRBS 610 or a corresponding set of $2^{13}$ RS 508 with consistent correlation properties is generated or generatable using the conventional (e.g., fixed) scrambling identifier selector in conjunction with the definition or data structure of the seed value 650, $c_{init}$. With 1008 PCIs, this gives only 8 unique sequences per cell.

Embodiments of the devices 100 and 200 may determine in the steps 302 and 402, respectively, the scrambling identifier selector $n_{SCID}$ as a function of time, t, and some identifier of the radio link referred to as the link identifier 516, M. Any implementation may comprise at least one of the following options.

As a first option, the pair $\{N_{ID}^{(0)}, N_{ID}^{(1)}\}$ of selectable scrambling identifiers, $N_{ID}^{(0)}$ and $N_{ID}^{(1)}$, which is RRC-configured by the base station 100 at the radio device 200 (and one of which is used in determining the seed value 650, $c_{init}$, at the radio device 200) may be $$\{N_{ID}^{(0)},N_{ID}^{(1)}\}=\{M,M\},$$

That is, both selectable scrambling identifiers are the same and correspond to the link identifier M. In other words, the first option is to set all selectable scrambling identifiers to the link identifier 516. By way of example, the link identifier 516, M, may be a function of or identical to the cell identifier (e.g., the PCI).

As a second option, the pair $\{N_{ID}^{(0)}, N_{ID}^{(1)}\}$ of selectable scrambling identifiers may be configured to be $\{N_{ID}^{(0)}, N_{ID}^{(1)}\}=\{M, N\}$ or $\{N, M\}$ with N being some value (e.g., identifier) different from the link identifier 516, M.

As a third option, one or each of the pair $\{N_{ID}^{(0)}, N_{ID}^{(1)}\}$ of selectable scrambling identifiers is a function of the link identifier 516, M. Alternatively or in addition, as a fourth option, one or each of the pair $\{N_{ID}^{(0)}, N_{ID}^{(1)}\}$ of selectable scrambling identifiers is unrelated to the link identifier 516, M. For example, the selectable scrambling identifiers, $N_{ID}^{(0)}$ and $N_{ID}^{(1)}$, are a cell identifier (e.g., PCI) of the base station 100, and the link identifier 516, M, is specific for the radio device 200, e.g., a RNTI of the UE 200.

In any embodiment, the time-dependency of the scrambling identifier selector 503, $n_{SCID}$, may be different for different radio links by virtue of the dependency of the scrambling identifier selector 503 on the link identifier 516, M. Hence, the RS 508 received over the radio link and an interfering RS 508 from another transmitter (e.g., another embodiment of the device 100 or 200 performing either the step 304-1 or 404-1) are cross-correlated as noise, have time-independent cross-correlation statistics and/or have cross-correlation statistics independent of the scrambling identifier of the interfering transmitter.

Figure 8:
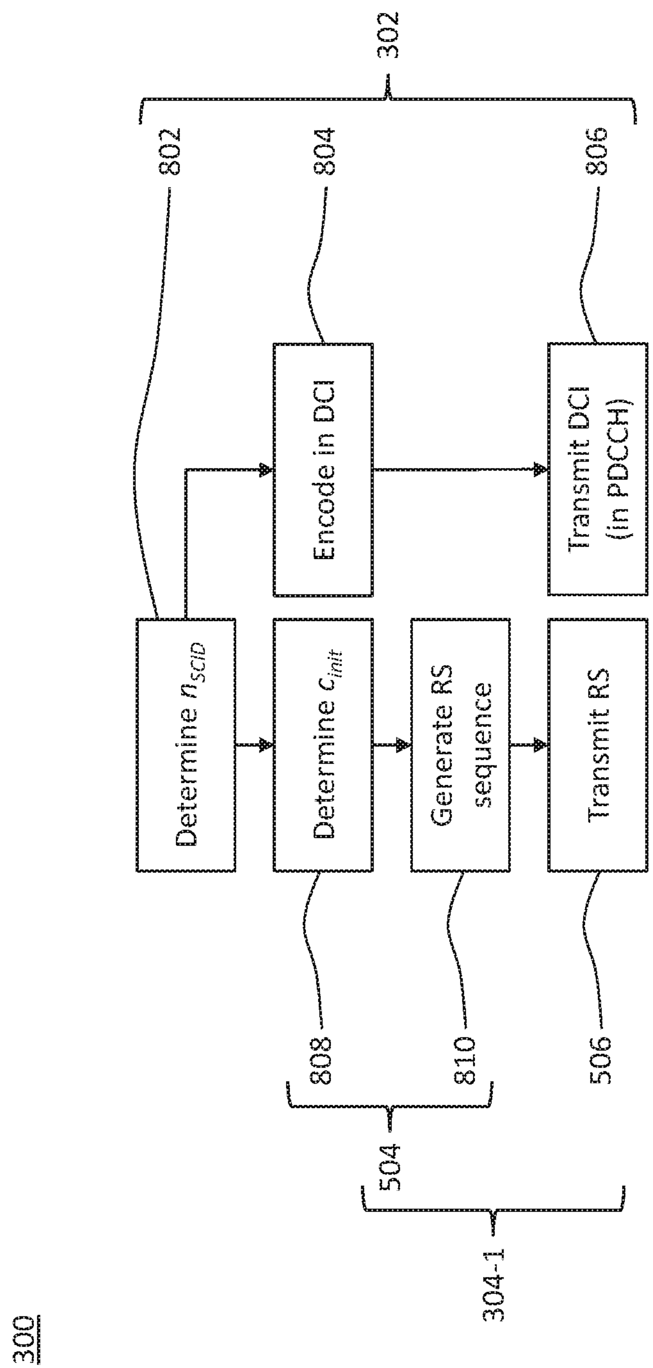
FIG. 8 shows a flowchart for an exemplary implementation of the method of FIG. 3.

FIG. 8 shows a flowchart for an exemplary implementation of the method 300. The steps of FIG. 8 may be implemented in combination with steps described in FIG. 5A or 5B. Like reference signs refer to equivalent or exchangeable steps.

In a substep 802 of the step 302, the scrambling identifier selector 503, $n_{SCID}$, is determined based on the time index 514, t, and the link identifier 516, M. The determined scrambling identifier selector 503 is used for both generating the PRBS 610 in the step 504 and transmitting the control message 502 in the step 302. In preparation of the control message transmission 302, the scrambling identifier selector 503 is encoded in the DCI in a substep 804 of the step 302. The DCI is transmitted on a physical downlink control channel (PDCCH) in a substep 806 of the step 302.

FIG. 8 shows the case of the base station transmitting the RS 508 according to the step 304-1. In preparation of the RS transmission 304-1, in a substep 808 of the step 504, the seed value 650, $c_{init}$, is determined depending on the scrambling identifier selector 503, which in turn depends on the time index 514 and the link identifier 516. In a further substep 810 of the step 504, the PRBS 610 generated (e.g., using the registers 602 and 604) and the RS 508 is derived from the PRBS 610.

The link identifier 516, M, may or may not be transmitted from the base station 100 to the radio device 200 (e.g., the UE 100). For example, information as to the link identifier 516, M, is only transmitted as the scrambling identifier selector 503, $n_{SCID}$, depending on the link identifier 516, M, according to the step 302. More specifically, the scrambling identifier selector 503, $n_{SCID}$, is transmitted as a function of the time) index 514, t, and the link identifier 516, M. The pair of $N_{ID}^{(0)}$ and $N_{ID}^{(1)}$, is also transmitted from the base station 100 to the radio device 200 using RRC configuration. Preferably, the link identifier 516, M, is not transmitted, e.g., except if the pair of $N_{ID}^{(0)}$ and $N_{ID}^{(1)}$ is derived from M. In the latter case, the link identifier, M, may be transmitted instead of the pair of selectable scrambling identifiers, $N_{ID}^{(0)}$ and $N_{ID}^{(1)}$.

For example, the link identifier 516, M, is not directly used for computing the seed value 650, $c_{init}$. That is, the (e.g., hard-coded) formula for computing the seed value 650, $c_{init}$, includes the selected scrambling identifier, $N_{ID}^{(n_{SCID})}$, and has no explicit dependency on the link identifier 516, M. Due to the seed value 650, $c_{init}$, depending on the scrambling identifier selector 503, $n_{SCID}$, and/or the selected scrambling identifier, $N_{ID}^{n_{SCID})}$, the seed value 650, $c_{init}$, may implicitly depend on the link identifier 516, M. Optionally, the selected scrambling identifier, $N_{ID}^{n_{SCID})}$, may be equal to the link identifier 516, M.

In one variant of any embodiment, the link identifier 516, M, is a cell identifier (e.g., the PCI). In another variant compatible with the one variant, the link identifier 516, M, may distinguish radio beams, transmission points of the cell and/or individual radio devices 200.

Example embodiments, each of which is combinable with any aforementioned embodiment, implementation and variant, are described. For 3GPP NR, the selected scrambling identifier $N_{ID}=N_{ID}^{(n_{SCID})}$ may be a function of $n_{SCID}(t, M)$.

First embodiments of the devices 100 and 200 determine, e.g., in the steps 304, 504 and/or 808, the seed value 650 based on the scrambling identifier selector 503, $n_{SCID}$, which is a function of the link identifier M (e.g., any of the scrambling identifiers, $N_{ID}$) and symbol index t, e.g., according to $$c_{init}\left(t, N_{ID}^{(n_{SCID})}, n_{SCID}(t, M)\right) = \mathrm{mod}\left(t \cdot \left(2 \cdot N_{ID}^{(n_{SCID})} + 1\right) \cdot 2^{17} + 2 \cdot N_{ID}^{(n_{SCID})} + n_{SCID}(t, M), 2^{31}\right).$$

It is clear, also from below arguments as to the linearity between seed value and resulting PRBS, that making $n_{SCID}$ only a function of symbol index t, or only a function of $N_{ID}$, does not substantially affect or improve the correlation properties over time.

Second embodiments of the devices 100 and 200, which may be combined with features of the first embodiments, may determine the scrambling identifier selector 503 according to $$n_{SCID}(t,M)=f_2(t\cdot(2\cdot M1)).$$

The scrambling identifier selector 503, $n_{SCID}$, depends on the product of the time index 514, t, and the link identifier M (e.g., any scrambling identifier, $N_{ID}$). The product is not linear in a modulo-2 sense and, hence, can result in good correlation properties.

Third embodiments of the devices 100 and 200, which may be combined with features of the first or second embodiment, use a scrambling identifier selector 503, $n_{SCID}$, that is a function of the 15th bit of the product $t\cdot(2M+1)$, e.g., according to $$n_{SCID}(t,M)=f_3(\lfloor \mathrm{mod}(t\cdot(2M+1),2^{15})/2^{14}\rfloor).$$

Consequently, the 15th bit of the product represented by the scrambling identifier selector 503 introduces a dependency in the seed value 650 that is complementary to the 14 bits of the product $t\cdot(2\cdot N_{ID}^{(n_{SCID})}+1)$ on which the seed value 650 also depends.

This further dependency effectively increases the bit width of the time dependent term in the scrambling identifier selector 503, $c_{init}(t, N_{ID})$ and, hence, it doubles the number of available RSs 508 with consistent correlation properties.

More specifically, the function $f_3$ may be the identity function, $b=f_3(b)$, the NOT operator, $f_3(b)=\neg b$, and/or a function of other quantities as well.

In any embodiment, the arrangement of the bit fields within the seed value 650 may be varied, e.g., relative to the definition in FIG. 7. An alternative definition of the seed value 650 is a permutation of the bits relative to the definition of the first embodiment. For example, each of the afore-mentioned functions for determining the scrambling identifier selector 503, $n_{SCID}$ may be applicable to a seed value defined according to $$c_{init}^{alternative}\left(t, N_{ID}^{(n_{SCID})}, n_{SCID}(t, M)\right) = \mathrm{mod}\left(t \cdot \left(2 \cdot N_{ID}^{(n_{SCID})} + 1\right) \cdot 2^{17} + N_{ID}^{(n_{SCID})} + 2^{16} \cdot n_{SCID}(t, M), 2^{31}\right).$$

Moreover, using this alternative definition (or formulation) of the seed value 650, $c_{init}^{alternative}$, for generating a RS supporting demodulation (DM-RS) may further reduce the inference caused to the DM-RS by other RSs defined for acquiring channel state information (CSI-RS).

Hereinbelow, limitations of existing RS for 3GPP NR and improvements brought about by embodiments are described in more detail. Particularly, the number of available RSs (as defined by scrambling identifiers and/or link identifiers 516) that have reasonable or consistent correlation statistics is discussed. For example, existing processes for generating RSs according to 3GPP NR may limit the number of RSs 508 (and a corresponding set of scrambling identifiers) with mutually consistent correlation properties to $2^{13}$. Embodiments may control and use $2^{14}$ RSs (and a corresponding set of scrambling identifiers and/or link identifiers 516) compatible with 3GPP NR.

The functional structure for the seed value 650, $c_{init}$, used at each of the base station 100 and the radio device 200 for generating a PRBS for 3GPP NR, e.g., according to the document 3GPP TS 38.211, version 15.0.0, clause 6.4.1.1.1 or 7.4.1.1.1, comprises $$\begin{aligned} c_{init}(t, n_{ID}, n_{SCID}) &= \mathrm{mod}(t\cdot(2\cdot n_{ID}+1)\cdot 2^{17}+2\cdot n_{ID}+n_{SCID}, 2^{31}), \\ &= \mathrm{mod}(t\cdot(2\cdot n_{ID}+1), 2^{14})\cdot 2^{17}+2\cdot n_{ID}+n_{SCID} \end{aligned}$$

wherein the symbol $n_{ID}$ is an abbreviation for the selected scrambling identifier, $N_{ID}^{(n_{SCID})}$.

In the conventional generation of RSs, only the first term in the definition of the seed value 650, mod $(t\cdot(2n_{ID}+1), 2^{14})$, is time-dependent. The condition for this term to be equal for two (potentially interfering) scrambling identifiers $n_{ID\text{-}1}$ and $n_{ID\text{-}2}$ for some time index t is:

$$\mathrm{mod}(t\cdot(2n_{ID\text{-}1}+1),2^{14})=\mathrm{mod}(t\cdot)2n_{ID\text{-}2}+1),2^{14})\Rightarrow t\cdot(2n_{ID\text{-}1}+1)=t\cdot(2n_{ID\text{-}2}+1)+X\cdot 2^{14}$$

with X being any integer. Hence, in order for the time-dependence the first term) to be equal for the two scrambling identifiers follows $$\Rightarrow n_{ID-1}=n_{ID-2}+\frac{X}{2t}\cdot 2^{14}.$$

This means (as X is any integer) that the two scrambling identifiers are related according to:

$$X=Yt\Rightarrow n_{ID\text{-}1}=n_{ID\text{-}2}+Y\cdot 2^{13}, Y \text{ being an integer.}$$

That is, for any $n_{ID\text{-}2}$ one may find an $n_{ID\text{-}1}=n_{ID\text{-}2}+Y\cdot 2^{13}$ that has identical time dependent scrambling, because the first term is identical for all t. Hence, only $2^{13}$ radio device-specific (e.g., UE-specific) scrambling identifiers may be conventionally found with unique trajectories over time. Clearly, a pair of scrambling identifiers with related trajectories over time leads to cross-correlation statistics of the corresponding pair of RSs that are very different from cross-correlation between pairs of RSs generated from scrambling identifiers in the set of unique trajectories over time. Hence, the existing technique for generating RSs will lead to inconsistent correlation properties, as measured over time, if not limited to the set of $2^{13}$ RSs.

The q≥1 additional time-dependent bits introduced in the seed value 650 by the time-dependent scrambling identifier selector 503 allow defining $2^{13+q}$ RSs, wherein the time-dependency of these RSs is uniquely defined by the combination of the selected scrambling identifier $N_{ID}^{(n_{SCID})}$ and the link identifier M, which may be identical and which are collectively referred to as scrambling identifier $n_{ID}$). For example, the selected scrambling identifier $N_{ID}^{(n_{SCID})}$ may comprise p>13 bits, so that a single identifier $M=N_{ID}^{(n_{SCID})}$ may be used for increasing the set of RSs with consistent correlation by a factor of $2^q$, wherein 1≤q≤p−13. By way of example, p=16.

The technical effect for various time-dependent scrambling identifier selectors is described. To this end, the correlation behavior of consistent and non-consistent RSs is exemplified. The effect of improved correlation statistics is achievable, even though the product, $t\cdot(2\cdot N_{ID}^{(n_{SCID})}+1)$ in the definition for the seed value 650, $c_{init}$, and the product, $t\cdot(2\cdot M+1)$, in the definition for the scrambling identifier selector 503, $n_{SCID}$, may be different. The special case of both of the selectable scrambling identifiers $N_{ID}^{(0)}$ and $N_{ID}^{(1)}$ of the configured pair being equal to M for generating $2^{13+q}$ RSs follows analogously to the above analytical derivation of the conventional $2^{13}$ RSs.

The generation of a Gold sequence as an example of the PRBS 610, c, e.g., in the steps 504 and/or 512, may be based on a modulo-2 additions of two m-sequences (e.g., the sequences 606 and 608), according to $$c(t,n_{ID})=x_1+x_2(t,n_{ID}),$$

wherein the first m-sequence $x_1$ may be initialized with a fixed seed (independent of configuration), and wherein the initialization of the second m-sequence $x_2$ is a function of a symbol counter as an example of the time index t and the scrambling identifier $n_{ID}$). In case the symbol counter t is linearly combined with the scrambling identifier $n_{ID}$, such as $c_{init}=2^{\lceil \log_2 max(n_{ID})\rceil}(l_{count}+1)+n_{ID}$, the second m-sequence can be expressed as $$x_2(t,n_{ID})=x_2^{(1)}(t)+x_2^{(2)}(n_{ID}),$$

which follows by noting that m-sequences are linear functions of the initialize (in modulo-2 sense). Hence, by linearly combining the symbol counter t and the scrambling identifier $n_{ID}$ (in modulo-2 sense), the cross-correlations between Gold sequences generated from two different scrambling identifiers may be expected to be highly correlated over time as $$c(t,n_{ID\text{-}1})=x_1+x_2^{(1)}(t)+x_2^{(2)}(n_{ID\text{-}1}), \text{ and and}$$

$$c(t,n_{ID\text{-}1})=x_1+x_2^{(1)}(t)+x_2^{(2)}(n_{ID\text{-}2})$$

Figure 9:
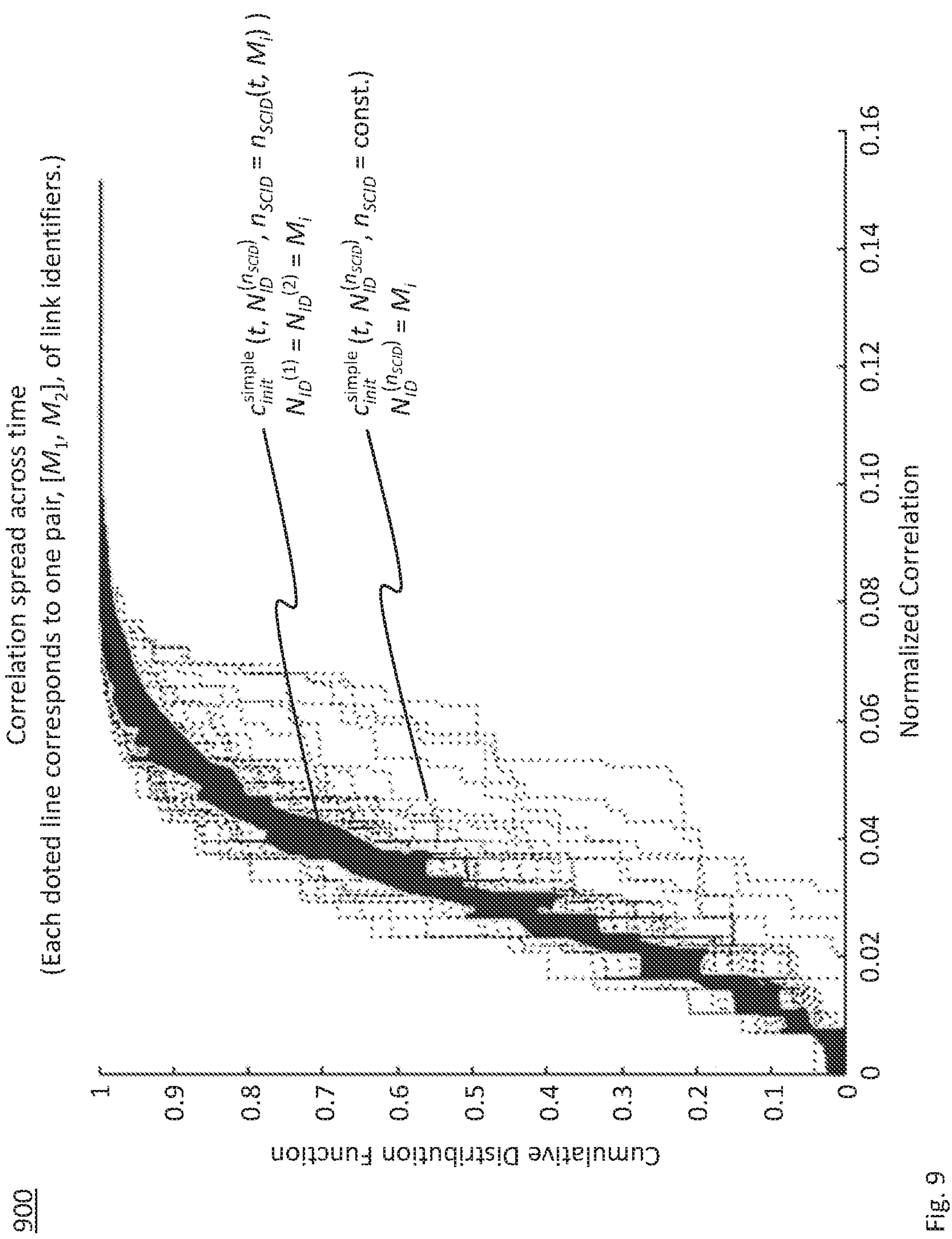
FIG. 9 shows a diagram with numerical examples for a finite-size cumulative distribution function (CDF) of cross-correlations over a predefined period of time between pairs of reference signals generated with and without an embodiment of the technique.
Figure 10:
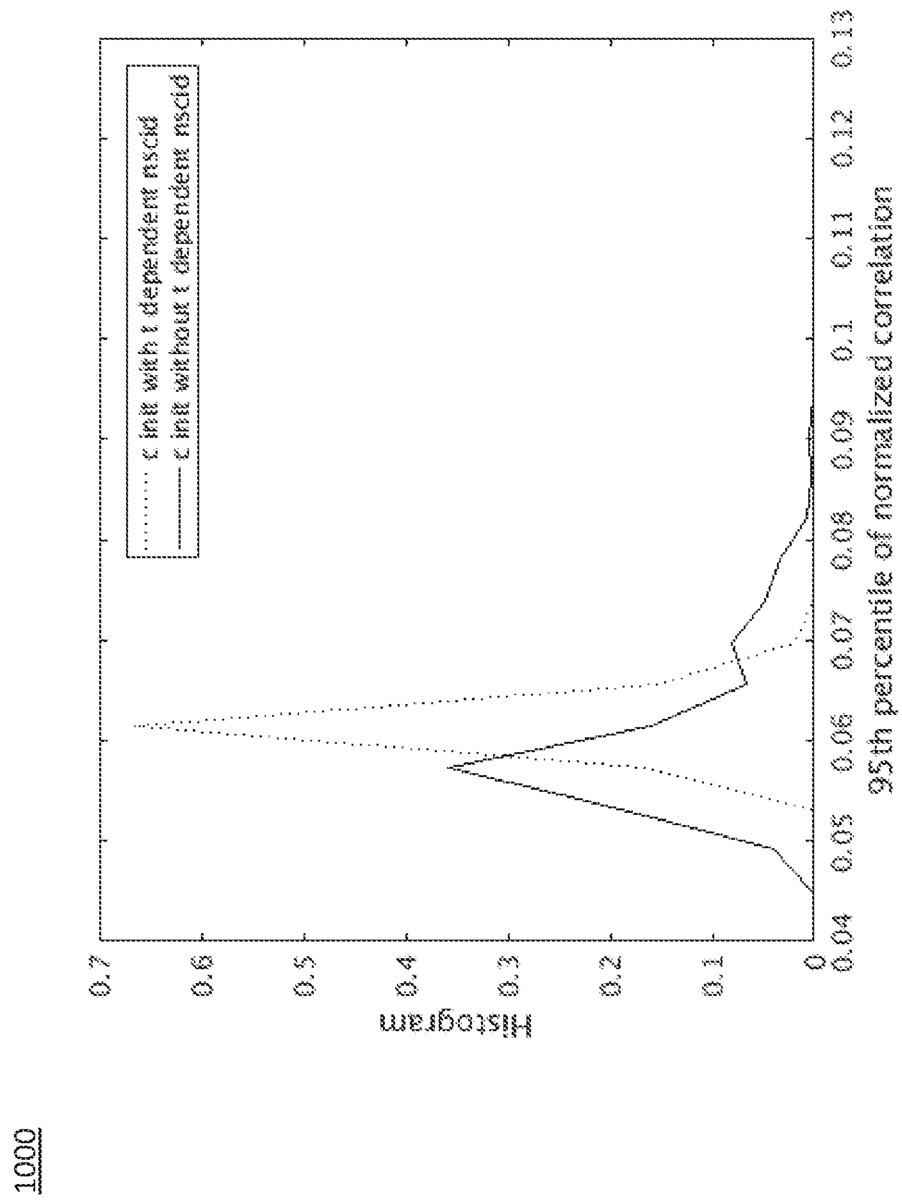
FIG. 10 shows a diagram with numerical examples for a probability distribution function (PDF) of the finite-time CDF of FIG. 9 at a predefined probability with and without an embodiment of the technique.

This correlation is also confirmed using numerical evaluations shown in FIGS. 9 and 10, with the $c_{init}^{sample}$ as a non-limiting example for defining the seed value 650.

The consistent correlation achievable by using the scrambling identifier selector 503 depending on the time index 514 and the link identifier 516 is further illustrated by numerical means with reference to FIGS. 9 and 10. The numerical evaluations of the cross-correlation between pairs are described, wherein the following results are intended to illustrate the statistical behavior of the cross-correlations over time resulting from scrambling identifiers and link identifiers that lead to consistent correlation properties as opposed to scrambling identifiers that do not. As a result, embodiments of the devices 100 and 200 have the benefit of increasing the set of scrambling identifiers and link identifiers with consistent correlation properties.

To illustrate the concept of the scrambling identifier selector 503 depending on the time index 514 and link identifier 516, a simplified definition for the seed value 650 is used, which is shown to be capable of achieving consistent correlation properties using the scrambling identifier selector 503 according to an embodiment. The simplified definition comprises no product-structure:

$$c_{init}^{simple}(t,n_{ID},n_{SCID})=2^B\cdot t+2\cdot n_{ID}+n_{SCID}.$$

Herein, $n_{ID}$ may be the selected scrambling identifier, $N_{ID}^{(n_{SCID})}$.

For the purpose of demonstrating the advantageous effect of the time-dependent scrambling identifier selector 503, it is numerically demonstrated that the simplified definitions can suffer from inconsistent correlation statistics if a fixed scrambling identifier selector 503, $n_{SCID}$, is used. More specifically, a bit width comprising, e.g., 10 bits for the scrambling identifier in the numerical evaluations means that there is a set of $2^{10}$ RSs with consistent correlation properties. Beyond this set, the simplified definition of the seed value suffers from the inconsistent correlation statistics. Furthermore, $c_{init}^{simple}$ will give unique sequences for different $n_{ID}$, but the time-dependent scrambling does not give consistent correlation properties, as is also the case for pairs of scrambling identifiers with the NR formulation out of the set of $2^{13}$ RSs with consistent correlation properties.

The following evaluation methodology has been applied. PRBSs 610 were generated using above simple formula for the seed value 650 and using the mechanism for generating a Gold-31 sequence as the PRBS 610 according to 3GPP NR, Pairs of scrambling identifiers, $\{n_{ID-1}, n_{ID-2}\}=\{M_1, M_2\}$, were drawn using a uniform distribution covering the full range (i.e., 0 to 1023 when evaluating 10 bits). The correlation between the resulting PRBSs 610 (e.g., of length 48 in the presented examples, wherein other lengths show the same behavior) generated by $n_1$ and the sequence generated by $n_1$ was computed for the full range of the symbol counter, t, (e.g., 8 to 147, when comparing with LIE) as an example of the time index 514.

The resulting correlation values were then plotted in the diagram 900 in FIG. 9 as a cumulative distribution function (CDF) across all time instances per randomly picked pair of scrambling identifiers, $\{n_{ID-1}, n_{ID-2}\}=\{M_1, M_2\}$. That is, FIG. 9 shows numerical examples for a CDF of the cross-correlation across the symbol counter, t, for randomly picked pairs of scrambling. The bit width of the RS scrambling identifiers is 10 bits.

Furthermore, the resulting cross-correlation were plotted as a histogram 1000 of the 95th percentile of the correlation across all random pairs of scrambling identifiers in FIG. 10. That is, FIG. 10 shows an exemplary histogram of the 95th percentile of correlation across the symbol counter, t, between a large number of sequences generated using the simple definition of the seed value.

FIG. 9 shows an exemplary CDF representing the statistics of the cross-correlation over time for 15 randomly picked RS identifiers using the simplified seed value definition with the time-dependent scrambling identifier selector 503 according to the technique and, as a comparison example, with a fixed scrambling identifier selector. As is evident from FIG. 9, using the fixed scrambling identifier selector leads to inconsistent correlation statistics (dotted lines), whereas the solid black area represents consistent correlation statistics resulting from the scrambling identifier selector 503 depending on both t and M.

FIG. 10 shows a corresponding histogram of the 95th percentile of the cross-correlation over 1000 such pairs. As is also evident from FIG. 10, using a fixed scrambling identifier selector leads to inconsistent correlation statistics (solid line whereas the dotted line represents sharp, i.e., consistent, correlation statistics resulting from the scrambling identifier selector 503 depending on both t and M.

Figure 11:
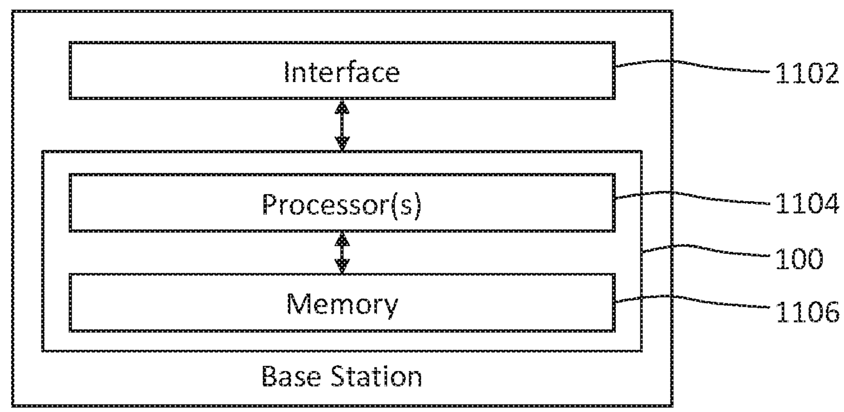
FIG. 11 shows a schematic block diagram of a base station embodiment of the device of FIG. 1.

FIG. 11 shows a schematic block diagram for an embodiment of the device 100. The device 100 comprises one or more processors 1104 for performing the method 300 and memory 1106 coupled to the processors 1104. For example, the memory 1106 may be encoded with instructions that implement at least one of the modules 102, 104 and 106.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1106, transmitter functionality. For example, the one or more processors 1104 may execute instructions stored in the memory 1106. Such functionality may include providing various features and steps discussed herein, including any of the benefits disclosed herein. The expression "the device being operative to perform an action" may denote the device 100 being configured to perform the action.

As schematically illustrated in FIG. 11, the device 100 may be embodied by a first radio device 1100, e.g., functioning as a transmitting UE. The first radio device 1100 comprises a radio interface 1102 coupled to the device 100 for radio communication with one or more radio devices and/or one or more other base stations.

Figure 12:
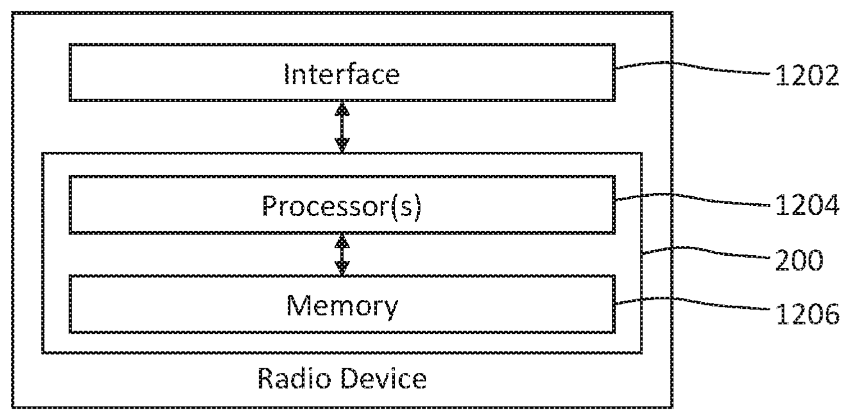
FIG. 12 shows a schematic block diagram of a radio device embodiment of the device of FIG. 2.

FIG. 12 shows a schematic block diagram for an embodiment of the device 200. The device 200 comprises one or more processors 1204 for performing the method 400 and memory 1206 coupled to the processors 1204. For example, the memory 1206 may be encoded with instructions that implement at least one of the modules 202, 204 and 206.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1206, receiver functionality. For example, the one or more processors 1204 may execute instructions stored in the memory 1206. Such functionality may include providing various features and steps discussed herein, including any of the benefits disclosed herein. The expression "the device being operative to perform an action" may denote the device 200 being configured to perform the action.

As schematically illustrated in FIG. 12, the device 200 may be embodied by a second radio device 1200, e.g., functioning as a receiving UE. The second radio device 1200 comprises a radio interface 1202 coupled to the device 200 for radio communication with one or more radio devices and/or one or more other base stations.

Figure 13:
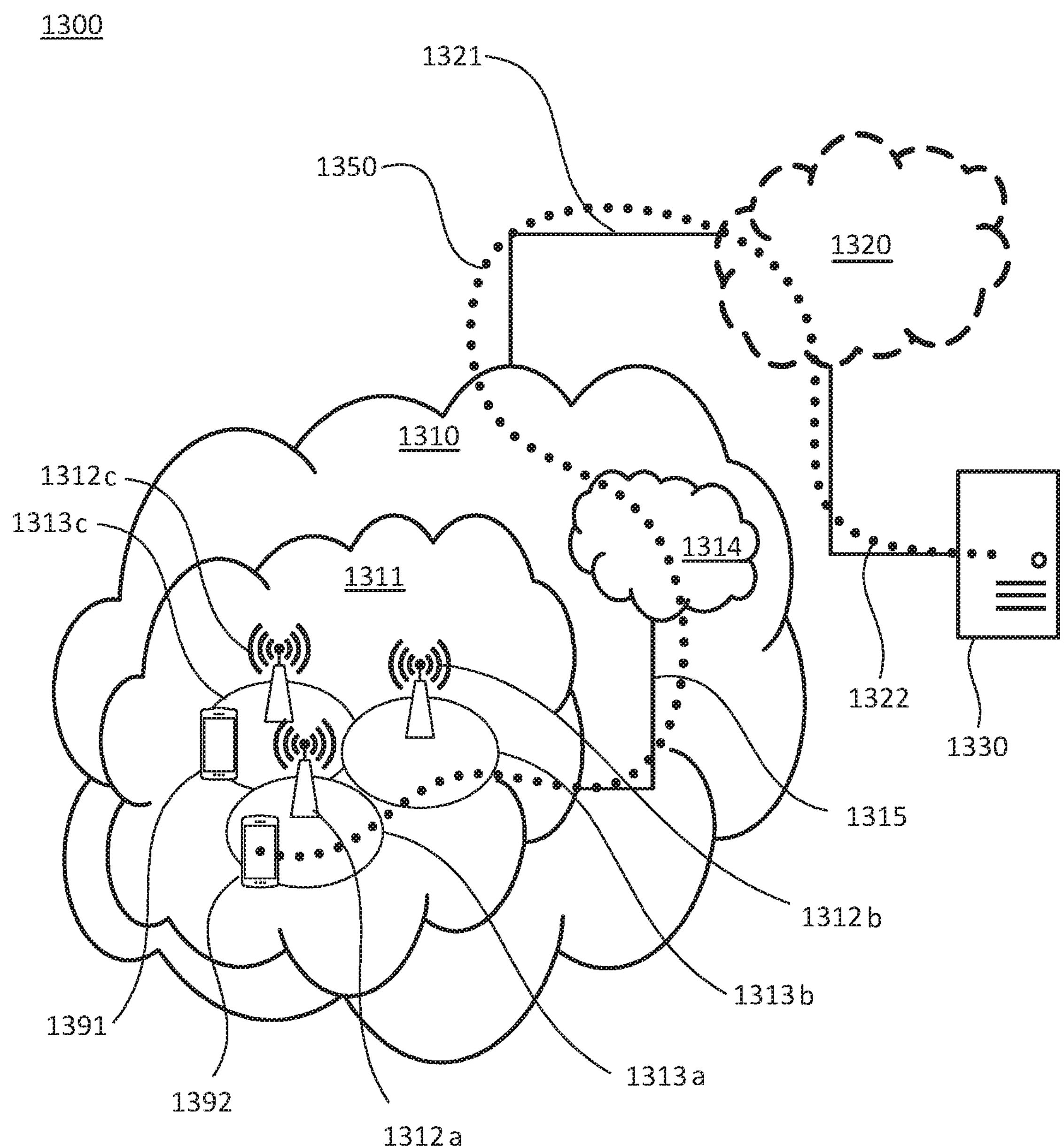
FIG. 13 schematically illustrates a telecommunication network connected via an intermediate network to a host computer.

With reference to FIG. 13, in accordance with an embodiment, a communication system 1300 includes a telecommunication network 1310, such as a 3GPP-type cellular network, which comprises an access network 1311, such as a radio access network, and a core network 1314. The access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to the core network 1314 over a wired or wireless connection 1315. A first user equipment (UE) 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

The telecommunication network 1310 is itself connected to a host computer 1330, which may be embodied in the hardware and/or software of a standalone server, a cloud-implemented server, a distributed server or as processing resources in a server farm. The host computer 1330 may be under the ownership or control of a service provider, or may be operated by the service provider or on behalf of the service provider. The connections 1321, 1322 between the telecommunication network 1310 and the host computer 1330 may extend directly from the core network 1314 to the host computer 1330 or may go via an optional intermediate network 1320. The intermediate network 1320 may be one of, or a combination of more than one of, a public, private or hosted network; the intermediate network 1320, if any, may be a backbone network or the Internet; in particular, the intermediate network 1320 may comprise two or more sub-networks (not shown).

The communication system 1300 of FIG. 13 as a whole enables connectivity between one of the connected UEs 1391, 1392 and the host computer 1330. The connectivity may be described as an over-the-top (OTT) connection 1350. The host computer 1330 and the connected UEs 1391, 1392 are configured to communicate data and/or signaling via the OTT connection 1350, using the access network 1311, the core network 1314, any intermediate network 1320 and possible further infrastructure (not shown) as intermediaries. The OTT connection 1350 may be transparent in the sense that the participating communication devices through which the OTT connection 1350 passes are unaware of routing of uplink and downlink communications. For example, a base station 1312 may not or need not be informed about the past routing of an incoming downlink communication with data originating from a host computer 1330 to be forwarded (e.g., handed over) to a connected UE 1391. Similarly, the base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In a communication system 1400, a host computer 1410 comprises hardware 1415 including a communication interface 1416 configured to set up and maintain a wired or wireless connection with an interface of a different communication device of the communication system 1400. The host computer 1410 further comprises processing circuitry 1418, which may have storage and/or processing capabilities. In particular, the processing circuitry 1418 may comprise one or more programmable processors, application-specific integrated circuits, field programmable gate arrays or combinations of these (not shown) adapted to execute instructions. The host computer 1410 further comprises software 1411, which is stored in or accessible by the host computer 1410 and executable by the processing circuitry 1418. The software 1411 includes a host application 1412. The host application 1412 may be operable to provide a service to a remote user, such as a UE 1430 connecting via an OTT connection 1450 terminating at the UE 1430 and the host computer 1410. In providing the service to the remote user, the host application 1412 may provide user data, which is transmitted using the OTT connection 1450. The user data may depend on the location of the UE 1430 determined in the step 206. The user data may comprise auxiliary information or precision advertisements (also: ads) delivered to the UE 1430. The location may be reported by the UE 1430 to the host computer, e.g., using the OTT connection 1450, and/or by the base station 1420, e.g., using a connection 1460.

The communication system 1400 further includes a base station 1420 provided in a telecommunication system and comprising hardware 1425 enabling it to communicate with the host computer 1410 and with the UE 1430. The hardware 1425 may include a communication interface 1426 for setting up and maintaining a wired or wireless connection with an interface of a different communication device of the communication system 1400, as well as a radio interface 1427 for setting up and maintaining at least a wireless connection 1470 with a UE 1430 located in a coverage area (not shown in FIG. 14) served by the base station 1420. The communication interface 1426 may be configured to facilitate a connection 1460 to the host computer 1410. The connection 1460 may be direct or it may pass through a core network (not shown in FIG. 14) of the telecommunication system and/or through one or more intermediate networks outside the telecommunication system. In the embodiment shown, the hardware 1425 of the base station 1420 further includes processing circuitry 1428, which may comprise one or more programmable processors, application-specific integrated circuits, field programmable gate arrays or combinations of these (not shown) adapted to execute instructions. The base station 1420 further has software 1421 stored internally or accessible via an external connection.

The communication system 1400 further includes the UE 1430 already referred to. Its hardware 1435 may include a radio interface 1437 configured to set up and maintain a wireless connection 1470 with a base station serving a coverage area in which the UE 1430 is currently located. The hardware 1435 of the UE 1430 further includes processing circuitry 1438, which may comprise one or more programmable processors, application-specific integrated circuits, field programmable gate arrays or combinations of these (not shown) adapted to execute instructions. The UE 1430 further comprises software 1431, which is stored in or accessible by the UE 1430 and executable by the processing circuitry 1438. The software 1431 includes a client application 1432. The client application 1432 may be operable to provide a service to a human or non-human user via the UE 1430, with the support of the host computer 1410. In the host computer 1410, an executing host application 1412 may communicate with the executing client application 1432 via the OTT connection 1450 terminating at the UE 1430 and the host computer 1410. In providing the service to the user, the client application 1432 may receive request data from the host application 1412 and provide user data in response to the request data. The OTT connection 1450 may transfer both the request data and the user data. The client application 1432 may interact with the user to generate the user data that it provides.

Figure 14:
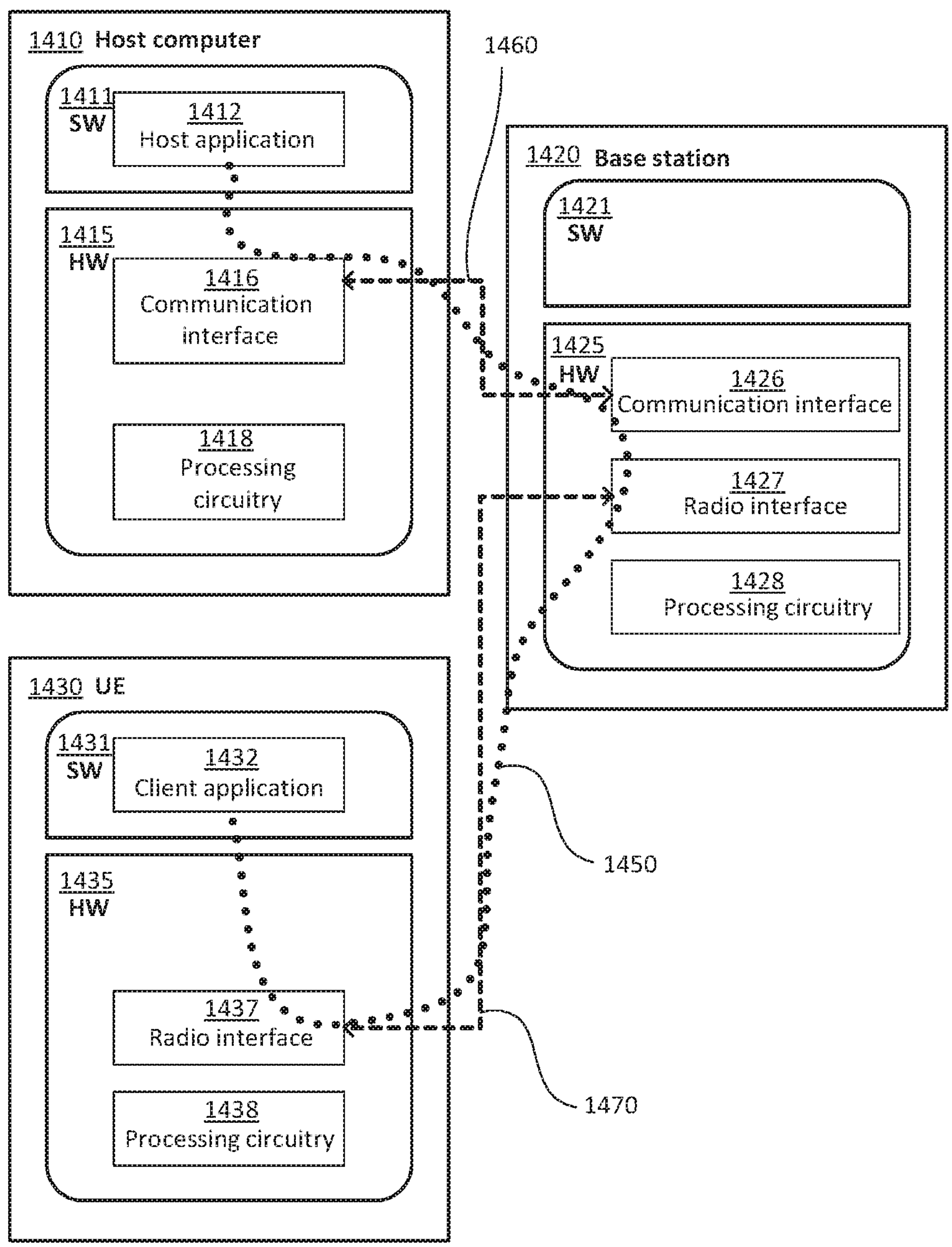
FIG. 14 shows a generalized block diagram of a host computer communicating via an embodiment of the base station of FIG. 11 with an embodiment of the user equipment of FIG. 12 over the radio link.

It is noted that the host computer 1410, base station 1420 and UE 1430 illustrated in FIG. 14 may be identical to the host computer 1130, one of the base stations 1112*a*, 1112*b*, 1112*c* and one of the UEs 1191, 1192 of FIG. 13, respectively. This is to say, the inner workings of these entities may be as shown in FIG. 14 and independently, the surrounding network topology may be that of FIG. 13.

In FIG. 14, the OTT connection 1450 has been drawn abstractly to illustrate the communication between the host computer 1410 and the use equipment 1430 via the base station 1420, without explicit reference to any intermediary devices and the precise routing of messages via these devices. Network infrastructure may determine the routing, which it may be configured to hide from the UE 1430 or from the service provider operating the host computer 1410, or both. While the OTT connection 1450 is active, the network infrastructure may further take decisions by which it dynamically changes the routing (e.g., on the basis of load balancing consideration or reconfiguration of the network).

The wireless connection 1470 between the UE 1430 and the base station 1420 is in accordance with the teachings of the embodiments described throughout this disclosure. One or more of the various embodiments improve the performance of OTT services provided to the UE 1430 using the OTT connection 1450, in which the wireless connection 1470 forms the last segment. More precisely, the teachings of these embodiments may reduce the latency and improve the data rate and thereby provide benefits such as better responsiveness.

A measurement procedure may be provided for the purpose of monitoring data rate, latency, interference and other factors on which the one or more embodiments improve. There may further be an optional network functionality for reconfiguring the OTT connection 1450 between the host computer 1410 and UE 1430, in response to variations in the measurement results. The measurement procedure and/or the network functionality for reconfiguring the OTT connection 1450 may be implemented in the software 1411 of the host computer 1410 or in the software 1431 of the UE 1430, or both. In embodiments, sensors (not shown) may be deployed in or in association with communication devices through which the OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of the OTT connection 1450 may include message format, retransmission settings, preferred routing etc.; the reconfiguring need not affect the base station 1420, and it may be unknown or imperceptible to the base station 1420. Such procedures and functionalities may be known and practiced in the art. In certain embodiments, measurements may involve proprietary UE signaling facilitating the host computer's 1410 measurements of throughput, propagation times, latency and the like. The measurements may be implemented in that the software 1411, 1431 causes messages to be transmitted, in particular empty or "dummy" messages, using the OTT connection 1450 while it monitors propagation times, errors etc.

Figure 15:
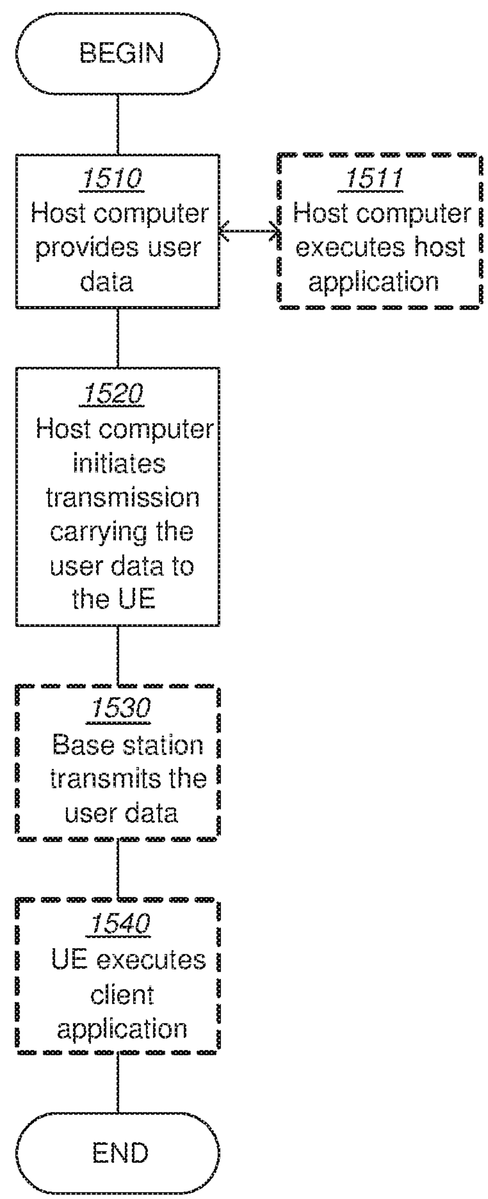
FIGS. 15 and 16 show flowcharts for methods implemented in a communication system including a host computer, a base station embodying the device of FIG. 1 and a user equipment embodying the device of FIG. 2.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In a first step 1510 of the method, the host computer provides user data. In an optional substep 1511 of the first step 1510, the host computer provides the user data by executing a host application. In a second step 1520, the host computer initiates a transmission carrying the user data to the UE. In an optional third step 1530, the base station transmits to the UE the user data which was carried in the transmission that the host computer initiated, in accordance with the teachings of the embodiments described throughout this disclosure. In an optional fourth step 1540, the UE executes a client application associated with the host application executed by the host computer.

Figure 16:
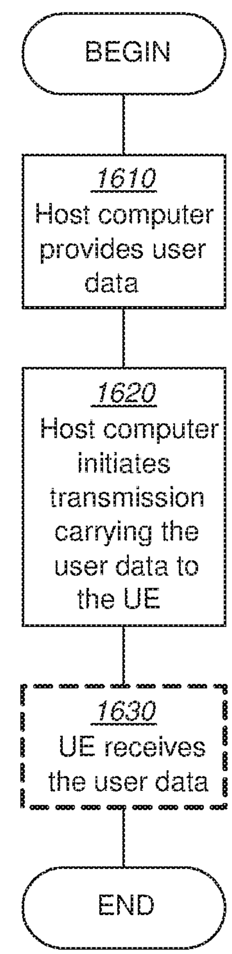

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In a first step 1610 of the method, the host computer provides user data. In an optional substep (not shown) the host computer provides the user data by executing a host application. In a second step 1620, the host computer initiates a transmission carrying the user data to the UE. The transmission may pass via the base station, in accordance with the teachings of the embodiments described throughout this disclosure. In an optional third step 1630, the UE receives the user data carried in the transmission.

In any embodiment of the device 100, 1100, 1312 or 1420 as well as of the device 200, 1200, 1391, 1392 or 1430, the time index t (e.g., a symbol counter or a function of the symbol counter) may be offset, e.g., in the sense of linear addition, by a function of the link identifier (e.g., identical to the selected or selectable scrambling identifier) in the definition of the scrambling identifier selector 503. This can provide superior consistency of correlation properties over time.

As has become apparent from above description, at least some embodiments increase the freedom in the planning of a RAN, e.g., as a pool of RSs, scrambling identifiers and/or link identifiers with consistent correlation properties doubles in size. This may be implementable without changing definitions of downlink control information or functionality for generating the RSs at the radio devices accessing the RAN. Same or further embodiments can enable larger cells of the RAN, a higher density of radio devices served by the RAN and/or more spatial streams per radio device.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of controlling a reference signal, RS, for a radio link between a base station and a radio device, the method comprising:

transmitting, to the radio device, a control message indicative of a scrambling identifier selector for selecting a scrambling identifier associated with the radio link, wherein the transmitted scrambling identifier selector depends on a time index and a link identifier associated with the radio link; and transmitting to or receiving from the radio device over the radio link the RS that is based on a pseudo-random binary sequence, PRBS, at a time according to the time index, wherein the PRBS is generated using a seed value depending on the time index, the scrambling identifier selector and the scrambling identifier selected according to the scrambling identifier selector.

2. The method of claim 1, wherein the link identifier, the selected scrambling identifier and/or one or each of the scrambling identifiers for the selection is indicative of at least one of the base station, the radio link and the radio device.

3. The method of claim 1, wherein one or each of the scrambling identifiers for the selection is identical to the link identifier, an identifier of the base station, an identifier of the radio device or a combination thereof.

4. The method of claim 1, wherein the scrambling identifier associated with the radio link is selected among a pair of scrambling identifiers, and wherein one or each of the pair of scrambling identifiers is a function of the link identifier.

5. The method of claim 4, further comprising the step of: transmitting, to the radio device, a radio resource control, RRC, message indicative of the link identifier.

6. The method of claim 4, further comprising the step of: transmitting, to the radio device, a radio resource control, RRC, message indicative of one or each of the pair of scrambling identifiers.

7. The method of claim 4, wherein the pair of scrambling identifiers is identical.

8. The method of claim 1, wherein the scrambling identifier associated with the radio link is selected among a pair of scrambling identifiers, and wherein one or each of the pair of scrambling identifiers is independent of the link identifier.

9. The method of claim 1, wherein the control message is transmitted and the corresponding RS is transmitted or received in the same transmission time interval, TTI, and wherein the time index is indicative of an orthogonal frequency-division multiplexing, OFDM, symbol within the TTI.

10. The method of claim 9, wherein the RS is transmitted or received on a plurality of resource elements, REs, at the time according to the time index, each of the REs corresponding to one or more bits of the PRBS according to a modulation scheme.

11. The method of claim 10, wherein each of the REs corresponds to two bits of the PRBS according to Quadrature Phase Shift Keying, QPSK.

12. The method of claim 1, wherein a bit in the seed value is indicative of the scrambling identifier selector and/or wherein the least significant bit, LSB, of the seed value is indicative of the scrambling identifier selector and/or wherein the seed value is a linear function of the time index.

13. The method of claim 1, wherein the RS is transmitted to the radio device for a downlink, DL, data transmission and/or wherein the RS is received from the radio device for an uplink, UL, data reception.

14. The method of claim 1, further comprising or initiating the step of:

transmitting to or receiving from the radio device data that is scrambled using at least one of the selected scrambling identifier and the generated PRBS.

15. The method of claim 1, wherein the dependency of the scrambling identifier selector on the time index comprises a product of the time index and an identifier function applied to the link identifier, optionally according to $$t \cdot f_{ID}(M),$$

wherein t is the time index, M is the link identifier and $f_{ID}$ is the identifier function.

16. The method of claim 15, wherein the identifier function is a linear function, optionally according to $$f_{ID}(x)=2x+1.$$

17. The method of claim 15, wherein the seed value comprises the k−1 least significant bits of the product of the time index and the identifier function applied to the selected scrambling identifier, and wherein the dependency on the scrambling identifier selector comprises the k-th bit of the product of the time index and the identifier function applied to the link identifier.

18. The method of claim 1, wherein the transmitting of the RS comprises or initiates the step of:

generating the PRBS prior to the transmission of the RS, wherein the transmitted RS is modulated according to the PRBS and/or wherein the receiving of the RS comprises or initiates the step of:

generating the PRBS after the reception of the RS, wherein the received RS is compared to the generated PRBS.

19. The method of claim 18, wherein the receiving of the RS further comprises or initiates at least one of the steps of:

estimating a time shift of a local oscillator based on the comparison; and estimating a channel of the radio link based on the comparison.

20. The method of claim 1, wherein the base station maintains radio links with a plurality of radio devices and performs the method with respect to each of the plurality of radio devices.

21. A method of using a reference signal, RS, for a radio link between a base station and a radio device, the method comprising:

receiving, from the base station, a control message indicative of a scrambling identifier selector for selecting a scrambling identifier associated with the radio link, wherein the received scrambling identifier selector depends on a time index and a link identifier associated with the radio link; and transmitting to or receiving from the base station over the radio link the RS that is based on a pseudo-random binary sequence, PRBS, at a time according to the time index, wherein the PRBS is generated using a seed value depending on the time index, the scrambling identifier selector and the scrambling identifier selected according to the scrambling identifier selector.

22. A communication system including a host computer comprising:

processing circuitry configured to provide user data; and a communication interface configured to forward user data to a cellular network for transmission to a user equipment, UE, wherein the UE comprises a radio interface and processing circuitry, the processing circuitry of the UE being configured to execute the steps of claim 21.

23. The communication system of claim 22, further including the UE and/or wherein the radio network further comprises a base station configured to communicate with the UE.

24. The communication system of claim 22, wherein:

the processing circuitry of the host computer is configured to execute a host application, thereby providing the user data; and the processing circuitry of the UE is configured to execute a client application associated with the host application.

25. A device for controlling a reference signal, RS, for a radio link between a base station and a radio device, the device comprising at least one processor and a memory, said memory comprising instructions executable by said at least one processor, whereby the first radio device is operative to:

transmit, to the radio device, a control message indicative of a scrambling identifier selector for selecting a scrambling identifier associated with the radio link, wherein the transmitted scrambling identifier selector depends on a time index and a link identifier associated with the radio link; and transmit to or receive from the radio device over the radio link the RS that is based on a pseudo-random binary sequence, PRBS, at a time according to the time index, wherein the PRBS is generated using a seed value depending on the time index, the scrambling identifier selector and the scrambling identifier selected according to the scrambling identifier selector.

26. A device for using a reference signal, RS, for a radio link between a base station and a radio device, the device comprising at least one processor and a memory, said memory comprising instructions executable by said at least one processor, whereby the second radio device is operative to:

receive, from the base station, a control message indicative of a scrambling identifier selector for selecting a scrambling identifier associated with the radio link, wherein the received scrambling identifier selector depends on a time index and a link identifier associated with the radio link; and transmit to or receive from the base station over the radio link the RS that is based on a pseudo-random binary sequence, PRBS, at a time according to the time index, wherein the PRBS is generated using a seed value depending on the time index, the scrambling identifier selector and the scrambling identifier selected according to the scrambling identifier selector.

* * * * *